United States Patent
Endo et al.

(10) Patent No.: US 6,876,377 B2
(45) Date of Patent: Apr. 5, 2005

(54) PHOTOSENSITIVE MATERIAL AND LASER MARKING METHOD

(75) Inventors: Keisuke Endo, Shizuoka-ken (JP); Hiroyuki Nishida, Shizuoka-ken (JP); Toru Kusano, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 74 days.

(21) Appl. No.: 10/287,534

(22) Filed: Nov. 5, 2002

(65) Prior Publication Data

US 2003/0164873 A1 Sep. 4, 2003

(30) Foreign Application Priority Data

Nov. 7, 2001 (JP) ........................................ 2001-342480
Dec. 27, 2001 (JP) ........................................ 2001-397975
Mar. 20, 2002 (JP) ........................................ 2002-078736

(51) Int. Cl.$^7$ ............................................... B41J 2/47
(52) U.S. Cl. ...................................................... 347/225
(58) Field of Search ................................ 347/224, 225, 347/234, 248, 229, 131, 235, 240, 251; 219/121.71, 121.6, 121.61, 121.62; 430/292

(56) References Cited

U.S. PATENT DOCUMENTS

| | | | | |
|---|---|---|---|---|
| 4,652,722 A | * | 3/1987 | Stone et al. | 219/121.76 |
| 5,063,137 A | * | 11/1991 | Kiyonari et al. | 430/292 |
| 5,940,115 A | * | 8/1999 | Nakamura et al. | 347/251 |
| 5,998,759 A | * | 12/1999 | Smart | 219/121.69 |
| 6,492,616 B1 | * | 12/2002 | Tanaka et al. | 219/121.71 |

FOREIGN PATENT DOCUMENTS

| | | |
|---|---|---|
| JP | 10-305377 | 11/1998 |
| JP | 3191201 | 5/2001 |

* cited by examiner

*Primary Examiner*—Hai Pham
(74) *Attorney, Agent, or Firm*—Sughrue Mion, PLLC

(57) ABSTRACT

A photosensitive material in which a fog unnecessary for a photosensitive material is not generated when irradiation of a laser beam and a character or a mark is printed by an array of optically distinguishable dot patterns is provided. When the dot patterns are arrayed by M number in column and N number in row and the character or the mark having a size of A×B is printed, the dot pattern has irregularity of no more than S+10 μm, and an almost circular shape of no lower than 100 μm and not more than the smaller diameter either A/M or B/N, when viewed from the emulsion layer side. A surface roughness is set in the range of 0.2 μm to 1.0 μm.

23 Claims, 19 Drawing Sheets

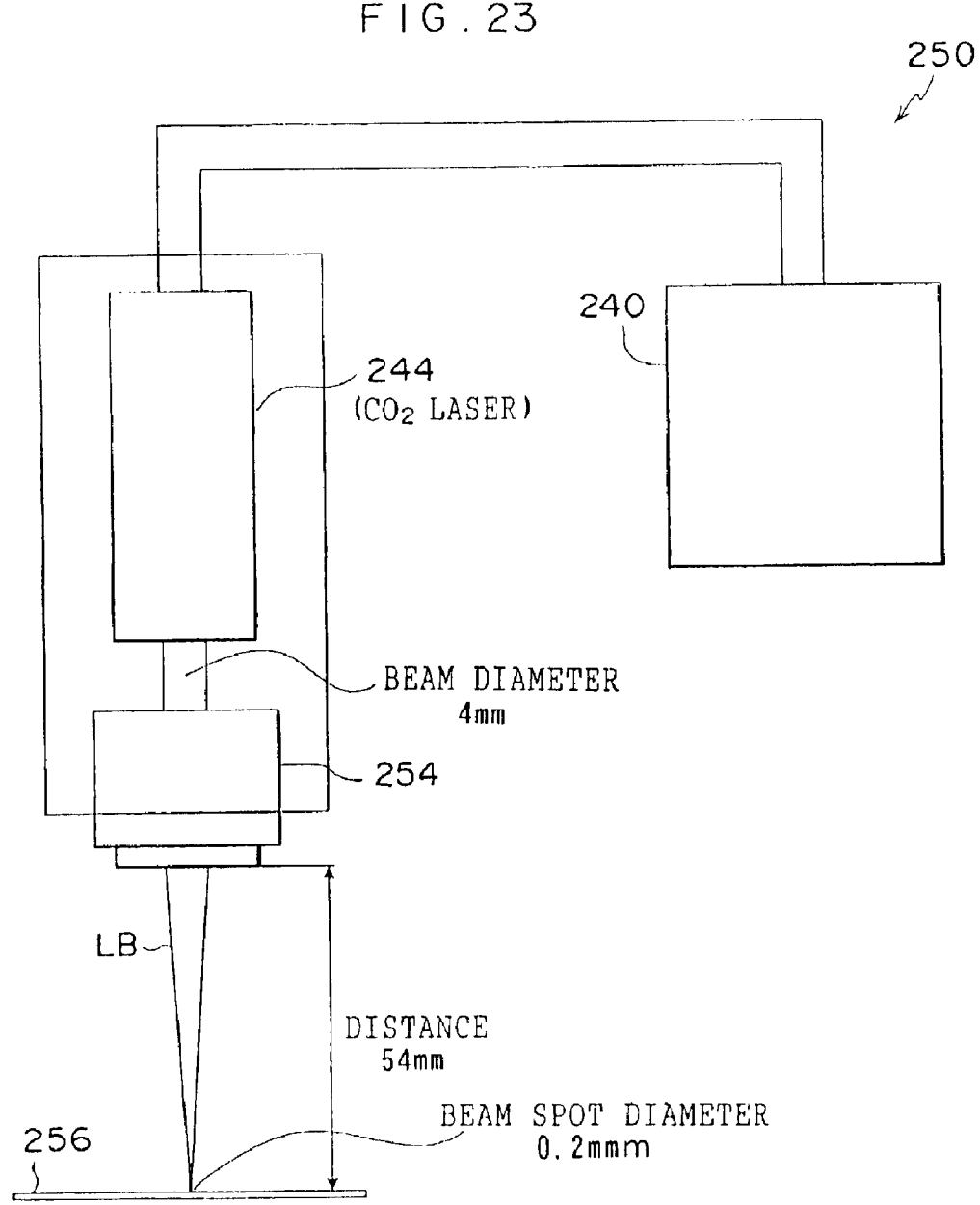

PHOTOSENSITIVE MATERIAL AND LASER MARKING METHOD

BACKGROUND OF THE INVENTION

1. Field of the Invention

The present invention relates to a photosensitive material where a character or a mark is printed by irradiation of a laser beam and a laser marking method thereof, in particular relating to the laser marking method where a dot pattern is formed at a certain position on the photosensitive material while the laser beam is irradiated from a laser onto the photosensitive material in which an emulsion layer is provided on a surface of a supporting body, a marking pattern including the visible character or mark is formed by a combination of the dot patterns.

2. Description of the Related Art

As described in Japanese Patent No. 3191201, a marking method where a laser beam is irradiated intermittently to form a dot pattern in order on a surface of a photosensitive material, and a character or a mark being readable by eye is printed by a range of the dot patterns is known. A partially melted trace is remained on the surface of the photosensitive material by irradiation of the laser beam, the melted trace is observed as the dot pattern, it is necessary that each dot pattern is easily distinguishable, in order to recognize with accuracy the character or the sign represented by an array of the dot patterns.

In order to form the easily distinguishable dot pattern, in the method described in the above-described gazette, some conditions such as energy density of the laser beam and irradiation time (pulse width) of the laser beam are set. However, except the irradiation time of the laser beam, since it is difficult to measure the energy density of the laser beam, it is actually difficult to manage the energy density of the laser beam, when a kind of the photosensitive material is varied, composition of a base layer or an emulsion layer is varied, so that this method is not an actual technique from a point of view of forming the dot pattern having stable quality.

When the laser beam is irradiated from an emulsion layer side of the photosensitive material, in case that the laser beam is reached to the base layer with a certain intensity, impurities contained in the base layer is emitted by acceptance of the irradiation, so that it is confirmed that a fog is generated in the emulsion layer. When the defect of the fog is generated, quality of the photosensitive material is remarkably reduced.

As shown in Japanese Patent No. 3191201, a marking method where the laser beam having a beam spot of an almost circular shape is irradiated to print the character or the mark while the photosensitive material in a shape of a web is conveyed is known. By irradiation of the laser beam, the dot pattern corresponding to the energy density and the irradiation time (pulse width) is formed on the surface of the photosensitive material, the dot patterns can be arrayed by proper number of dots in column and proper number of dots in row to print the optional character or mark.

In the method described in Japanese Patent No. 3191201, a technique where a plurality of laser oscillators are arranged in parallel in a scanning direction perpendicular to a conveying direction of the photosensitive material, the laser oscillators are selectively turned on and off corresponding to the character pattern to be printed is taken, the conditions of the energy density of the laser beam and the irradiation pulse width of the laser beam are set so as to form the dot patterns uniformly by each laser oscillator.

In case that the energy density and the pulse width of the laser beam irradiated to the photosensitive material can be controlled accurately as Japanese Patent No. 3191201, the dot pattern becomes uniform to increase the visibility of the character pattern. However, the pulse width per dot of the laser beam is an order from $10^{-5}$ to $10^{-6}$ sec, it is very difficult to measure accurately the energy density of the laser beam in the pulse width. Though it is possible that the laser beam is continuously oscillated and mean energy density is estimated from a diameter of the printed dot, because there is difference between output power characteristics in case of continuous oscillation of the laser oscillator and the output power characteristics in case of build up driving, estimation of the energy density within the pulse width is not reliable.

In the irradiation spot of the laser beam, generally the energy density of a peripheral portion of the spot is lower than that of a central portion. Accordingly, in case that the laser beam is irradiated at a shorter pulse width, the dot pattern having the smaller diameter than the irradiation spot is formed, in case that the laser beam is irradiated at a longer pulse width, the dot pattern having the larger diameter than the irradiation spot is formed because heat conducts surroundings of the irradiation spot. Even though the energy density of the laser beam is calculated based on the dot diameter, the former is calculated higher than actual and the latter is calculated lower than actual.

For the reason, except the pulse width of the laser beam, it is not practical that condition for printing on the photosensitive material is set on a basis of the energy density. Furthermore, when a plurality of laser oscillators are arranged in parallel to use, it is necessary that conditions of each laser oscillator are set, and it is necessary to correspond change in kinds of the photosensitive material, so that it is not practical from a point of view of uniformity of the dot pattern constituting the character and the mark. When the dot pattern is dispersed, a dot having little concave and convex portions and low visibility is generated, energy is given to the impurities by excess laser beam irradiation and the fog of the photosensitive layer is generated by emission.

For example, in Japanese Patent Application Laid-Open (JP-A) No. 10-305377, a detecting method for a laser forming state and a laser forming system are disclosed as a technique marking a character or a sign on a surface of a material by using a laser beam.

In JP-A No. 10-305377, when a part of layers of a laminated film, which is combined by resin films having different laser absorption characteristics, is formed by a laser, for example, half-cutting forming (melting only some of layers) for giving easy opening to a packaging is described.

A technique that the laser beam is irradiated to the photosensitive material such as an x-ray film to form a marking by thermal fogging or deformation of a surface of the photosensitive material is proposed in Japanese Patent No. 3191201.

In Japanese Patent No. 3191201, irradiation time (pulse width) of the laser per dot is set at least not lower than 30 $\mu$m in order to form the thermal fogging and the deformation for increasing visibility.

However, when the photosensitive material is conveyed at high speed, a problem that the irradiation time of the laser cannot be taken sufficiently is generated.

As shown in FIGS. 24A and 24B, when one character is formed by a dot matrix of 5×5 dots (=25 dots) (in case of FIG. 24A, all dots are represented by solid), an area of one character should be 1.8 mm and a dot diameter should be 200 μm, actually the irradiation time is not sufficient, which causes the dot to be flown. A case that the dot is flown by 100 μm is shown in FIG. 24B, as a result, the pattern is formed in only an area (overlapping area) always irradiated by the laser while the dot is flown.

That is to say, there is a problem that, when the conveying speed of the photosensitive material is increased, the proper dot pattern is not formed by the irradiation time in the present and the conveying speed is limited.

Suppose that the dot is flown by 100 μm is a tolerance, relation between the irradiation time and the conveying speed of the photosensitive material, as shown in FIG. 25, limits to 200 m/min in a related art of 30 μm.

For example, in a system which the photosensitive material is conveyed in a sub-scanning direction while the laser beam is scanned in a main-scanning direction, when one character is formed by five dots in the main-scanning direction (laser scanning direction) and five dots in the sub-scanning direction (conveying direction of the photosensitive material) (5×5=25), an area of one character is 1.8 mm, irradiation possible time t per dot can be represented by the following equation.

Irradiation possible time per dot=scanning width of one character/(line speed×the number of dots of one character).

For example, let the present line speed be 200 m/min, $$t=(1.8 \text{ mm})/\{(200 \text{ m/min})\times 25\}$$

Arranging the unit, $$t=(1.8\times 1000\times 60000)/(200\times 1000\times 25)=108000000/5000000=21.6 \text{ μsec}$$

As shown in the above-described calculation, the necessary irradiation time of the laser is not obtained. Furthermore, when the dot matrix of two characters is formed by one main-scan, only 10.8 μsec of a half value of the calculation can be secured.

On the contrary, when the dot matrix of two characters is formed by 30 μsec of the related art, the line speed is limited to 80 m/min. In case of the dot matrix of one character, the line speed is limited to 160 m/min.

For this reason, the number of dots of one character constituting the dot matrix has to be reduced in order to increase the line speed faster than the speed described above, which results in reduction of the visibility, and in worst case, it is possible that the character and the sign are not distinguishable. The laser intensity is set at tolerance limit, the laser intensity is not increased any more because the fog is generated by emission of the dust in the emulsion layer.

SUMMARY OF THE INVENTION

It is an object of the present invention to provide a photosensitive material, which an unnecessary fog for the photosensitive material is not generated in an irradiation of a laser beam, and a character or a mark is printed by an array of an optically easily distinguishable dot pattern and a marking method thereof.

It is another object of the invention to provide a photosensitive material, which a shape of a dot pattern itself formed by an irradiation of a laser beam is analyzed, and a character or a mark is printed by an easily distinguishable dot pattern and a marking method thereof.

It is still another object of the invention to obtain a laser marking method where production line speed is not limited by an irradiation time of a laser, an emulsion layer is not harmfully affected and a marking pattern can be formed by an array of an optically easily distinguishable dot pattern.

In a first aspect of the invention, it is aimed that identification of a dot pattern depends on a shape of the dot pattern itself on a surface of the photosensitive material. When the dot patterns formed by irradiation of a laser beam from a side of an emulsion layer having a thickness S are arrayed by an M number in column and an N number in row to print a character or a sign having a size of A×B, the dot pattern has irregularity not more than S+10 μm and an almost circular shape of no lower than 100 μm and not more than the smaller diameter either A/M or B/N when viewed from the emulsion layer side. And a surface roughness of the dot pattern is set in the range of 0.2 μm to 1.0 μm in order to maintain the good visibility of the dot pattern. By using the dot pattern, printing of an easily visible character or mark can be done without defects of fog. The character or mark printed by the first aspect of the invention can be read not only by eye but also, for example, automatically reading utilized infrared in a dark room. The dot pattern is not always in the circular shape.

When irradiation time of the laser beam per dot pattern is longer, because heat generated in an irradiated area conducts to enlarge a melted area and the diameter of the dot pattern tends to become larger than a target value, it is preferable that the laser beam having an oscillation wavelength range of 9 μm to 10 μm is irradiated for an range of 3 μsec to 20 μsec when a thickness of the emulsion layer is in the range of 3 μm to 5 μm, the photosensitive material is an x-ray film using PET (polyethylene terephthalate) as a base layer.

As described above, according to the first aspect, when the dot patterns formed by irradiation of a laser beam from a side of an emulsion layer having a thickness S are arrayed by an M number in column and an N number in row to print a character or a sign having a size of A×B, the dot pattern has irregularity not more than S+10 μm and an almost circular shape of no lower than 100 μm and not more than the smaller diameter either A/M or B/N. And a surface roughness of the dot pattern is set in the range of 0.2 μm to 1.0 μm. This results in the optical visibility of the dot pattern, elimination of the fog unnecessary for the photosensitive material, and formation of a high quality marking. Particularly it is preferable that the laser beam having the oscillation wavelength range of 9 μm to 10 μm is irradiated in the range of 3 μsec to 20 μsec when the x-ray film using PET as the base layer of the photosensitive material.

In a second aspect of the invention, when the photosensitive material is partially melted by the irradiation of the laser beam to form the dot patterns including a concave and convex portion and the dot patterns are arrayed to print the character or the mark, in at least 80% of the amount of the dot patterns, a depth of a concave portion formed in a film base right beneath the dot pattern is set in a range of 3 μm to 10 μm. The invention has a structure which the character or the sign is printed while the laser beam is scanned by a acousto-optic device, so that it is not necessary to set various conditions in a plurality of laser oscillator. However, in consideration of responsibility of the acousto-optic device is varied by heat from the laser beam, the second aspect is so contrived that the acousto-optic device will prevent from heating extraordinarily by the laser beam.

One of the criteria is that the irradiation time of the laser beam to total printing time required to print the printing pattern of the one unit is set at not more than 70%, when a printing pattern of one unit including the character or the mark to be printed repeatedly is marked. Furthermore, when the printing pattern of the one unit is marked at a constant repeated period, it is effective that the total printing time required to print the printing pattern of the one unit to the repeated period is set not more than 70%. There is a case, which laser energy is not absorbed completely in a film and a part of the laser energy is transmitted, dependent on a combination of wavelength of the laser beam and a kind of the photosensitive material to be printed. There is also a case, which laser energy is not absorbed completely in the film and a part of the laser energy is transmitted, dependent on the transmission energy. The fog is generated in a photosensitive layer in a manner that dust adhesive to a roller or a belt, which is in contact with a non-printing surface of the photosensitive material, is heated and emitted by the transmission energy. For preventing this problem, it is effective that the photosensitive material is floated in the air in an area where the laser beam is scanned, and at least a solid body more than one time of a focal distance of a condensing lens, which focuses the laser beam on the photosensitive material is not existed in an extended optical axis of the laser beam of the non-printing surface side. When the printing is done while the photosensitive material in a shape of a web is conveyed, concerning a conveying direction of the photosensitive material, conveying rollers are provided in an upstream side and a downstream side of an area where the laser beam is scanned, the photosensitive material is floated in the air in an area where the laser beam is scanned and nothing is in contact with the non-printing surface of the photosensitive material, and tension not lower than 0.1 kg/cm is given to the photosensitive material per unit width, accordingly, it is prevented that the web is vibrated in a thickness direction to vary a distance between the condensing lens and the printing surface of the photosensitive material.

As described above, according to the second aspect, when the dot pattern is formed by irradiating the laser beam from the emulsion layer side, since the depth of the concave portion formed in the film base is made in the range of 3 $\mu$m to 10 $\mu$m, good visibility can be secured without generating the fog. Though it is desirable that the depth of the concave portion concerning the all dot patterns is in the range, when the 80% of the amount of dot patterns are satisfied with this condition, the second aspect can be realized from a point of view of the visibility of the character. With respect to heat resistance of the acousto-optic device scanning the laser beam and tension in printing while the photosensitive material is floated in the air, countermeasures also are taken, so that the fog is not generated and the good marking can be done continuously.

A third aspect of the invention provides a laser marking method where a dot pattern is formed at a certain area and a marking pattern including a visible character or mark is formed by a combination of the dot patterns while a laser beam is irradiated from a laser to a photosensitive material in which an emulsion layer is provided on a surface of a supporting body, the third aspect is characterized in that an oscillation wavelength of the laser is selected on a basis of possible irradiation time of the laser beam to each dot pattern for forming a visible dot pattern.

According to the third aspect, influence on the emulsion (thermal absorption efficiency) is different by the oscillation wavelength of the laser even, though the lasers having the different oscillation wavelengths are the same irradiation time. Thus, a production line speed of a set target can be obtained by selecting the oscillation wavelength of the laser on a basis of the irradiation possible time.

In the third aspect, the possible irradiation time of the laser beam may be computed by a moving speed of the photosensitive material within an area of the marking pattern.

According to the operation, the possible irradiation time of the laser is carried out the operation by the moving speed of the photosensitive material in a range of the marking pattern, finally an oscillation wavelength of the laser is selected by absorption characteristics, a thickness of the emulsion layer, and a kind of the supporting body. A concept that the oscillation wavelength of the laser is selected by considering various factors has never been, even though the selected oscillation wavelength is the same oscillation wavelength as the related art, its function and effect are completely different.

A fourth aspect of the invention provides a laser marking method where a laser beam is irradiated from a $CO_2$ laser to a photosensitive material in which an emulsion layer is provided on a surface of a PET layer acting as a supporting body, a dot pattern in a shape of a matrix is formed at a certain area and where a marking pattern including a visible character or mark is formed by a combination of dot patterns formed in a predetermined area, the fourth aspect is characterized in that an oscillation wavelength of the $CO_2$ laser is set within a range of 9.2 $\mu$m to 9.8 $\mu$m.

According to the fourth aspect, the dot pattern in the shape of the matrix is formed in a certain area by a plurality of dot patterns, in using the dot pattern in the shape of the matrix as the marking pattern, the $CO_2$ laser is utilized as an oscillation source of the laser beam, the oscillation wavelength of the $CO_2$ laser is set within a range of 9.2 $\mu$m to 10.6 $\mu$m.

The oscillation wavelength within the range of 9.2 $\mu$m to 9.8 $\mu$m of the $CO_2$ laser is different from the oscillation wavelength (about 10.6 $\mu$m) of a commercial type of $CO_2$ laser and is not a generally utilized wavelength range. However, by selecting the wavelength range, it is found that the dot pattern having high visibility is formed in the irradiation time less than 10 $\mu$sec.

In the fourth aspect, it may be also usable that, the oscillation wavelength is in a range of 9.2 $\mu$m to 9.8 $\mu$m of the $CO_2$ laser, an irradiation time per one dot pattern is within the range of not lower than 6 $\mu$sec to not more than 70 $\mu$sec and fluence per one dot pattern is within the range of not lower than 0.9 $J/cm^2$ to not more than 10.5 $J/cm^2$.

According to the method, it is usable in the oscillation wavelength within the range of 9.2 $\mu$m to 9.8 $\mu$m of the $CO_2$ laser that, when the productivity (line speed) is not considered, the irradiation time per one dot pattern is within the range of not lower than 6 $\mu$sec to not more than 70 $\mu$sec and the fluence per one dot pattern within the range of not lower than 0.9 $J/cm^2$ to not more than 10.5 $J/cm^2$. In case that the irradiation conditions of the $CO_2$ laser are in the above-described range, the visibility of the marking pattern can be secured and the fog is not generated.

It may be also possible in the third or fourth aspect that the dot pattern is formed in a predetermined area by relatively main-scanning and sub-scanning the photosensitive material, where the laser beam and the photosensitive material move in relation to each other, and the marking pattern including the visible character or mark that is formed by a combination of the dot patterns.

According to the method, a plurality of dots can be formed by the $CO_2$ laser of one line in a manner of the main scan of the laser beam, the visible marking pattern can be formed by the dot pattern in the shape of the matrix in a manner of the sub-scan of the photosensitive material.

In the $CO_2$ laser of the wavelength within the range of 9.2 μm to 9.8 μm, for example, in case that the marking pattern of two characters (one character is 5×5 dots), which is described in the related art, is formed in a main scanning direction, the line speed of 240 m/min can be achieved. When it is one character in the main scanning direction, the line speed becomes 480 m/min.

As described above, the third and fourth aspects have advantages that the production line speed is not limited by the irradiation time of the laser, the emulsion layer is not harmfully affected by the irradiation time of the laser and the marking pattern can be formed by the array of the optically easily distinguishable dot pattern.

The first, second, and third aspects or the first, second, and fourth aspects may be combined optionally.

BRIEF DESCRIPTION OF THE DRAWINGS

FIG. 23 shows a schematic configuration of an experimental apparatus applied for evaluation of relation between a marking shape and irradiation energy by using a $CO_2$ laser in a third embodiment.

DESCRIPTION OF THE PREFERRED EMBODIMENTS

First Embodiment

Figure 1:
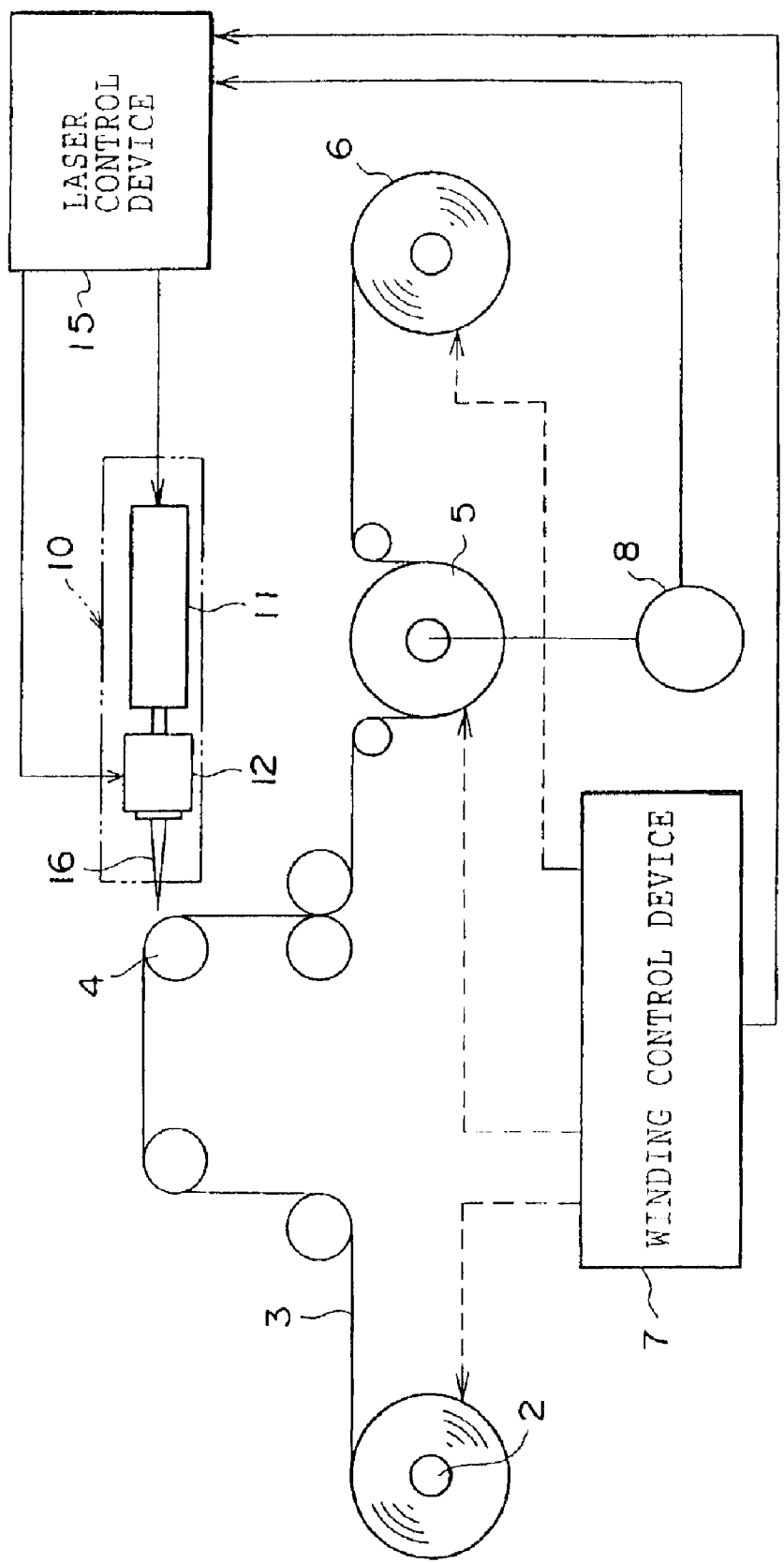
FIG. 1 is a schematic view of a laser marking apparatus in a first embodiment.

FIG. 1 shows a schematic illustration of a laser marking apparatus, which a laser beam is irradiated to print on a surface of an x-ray film in a process conveying the x-ray film in a shape of a continuous sheet. An x-ray film 3 is wound around a core 2 with an emulsion face directed to a surface side, the x-ray film 3 is wound up by a core 6 through an appropriate pass roll, a print roll 4, and a suction drum 5. Many air suction holes are formed around outer periphery of the suction drum 5, the suction drum 5 is rotated at a constant speed by a driving signal from a winding control device 7. The winding control device 7 also controls a rotation of the roll 2 and gives constant back tension to the x-ray film 3 between the roll 2 and the suction drum 5. The roll 6 is driven to wind the x-ray film 3 sent from the suction drum 5.

The suction drum 5 having many air suction holes at its outer periphery conveys the x-ray film 3 at a constant speed without a slip while a base face side of the x-ray film 3 is absorbed. Accordingly, a conveying speed of the x-ray film 3 on the print roll 4 corresponds to a peripheral speed of the suction drum 5. A rotary encoder 8 is combined with the suction drum 5, the rotary encoder 8 outputs a conveying pulse corresponding to a rotating speed of the suction drum 5.

A printhead 10 is provided opposing to the outer periphery of the print roll 4. The printhead 10 includes a laser oscillator 11 and a beam deflector 12 containing a condensing lens. The laser oscillator 11 includes a $CO_2$ gas laser tube, and radiates a laser beam having a constant oscillation wavelength and a constant time width (pulse width) at timing responsive to a driving signal from a laser control device. The beam deflector 12 includes, for example, an acousto-optic device (AOD), and scans the laser beam in a perpendicular direction to a conveying direction of the x-ray film 3 by a deflection signal from the laser control device 15.

Figure 2:
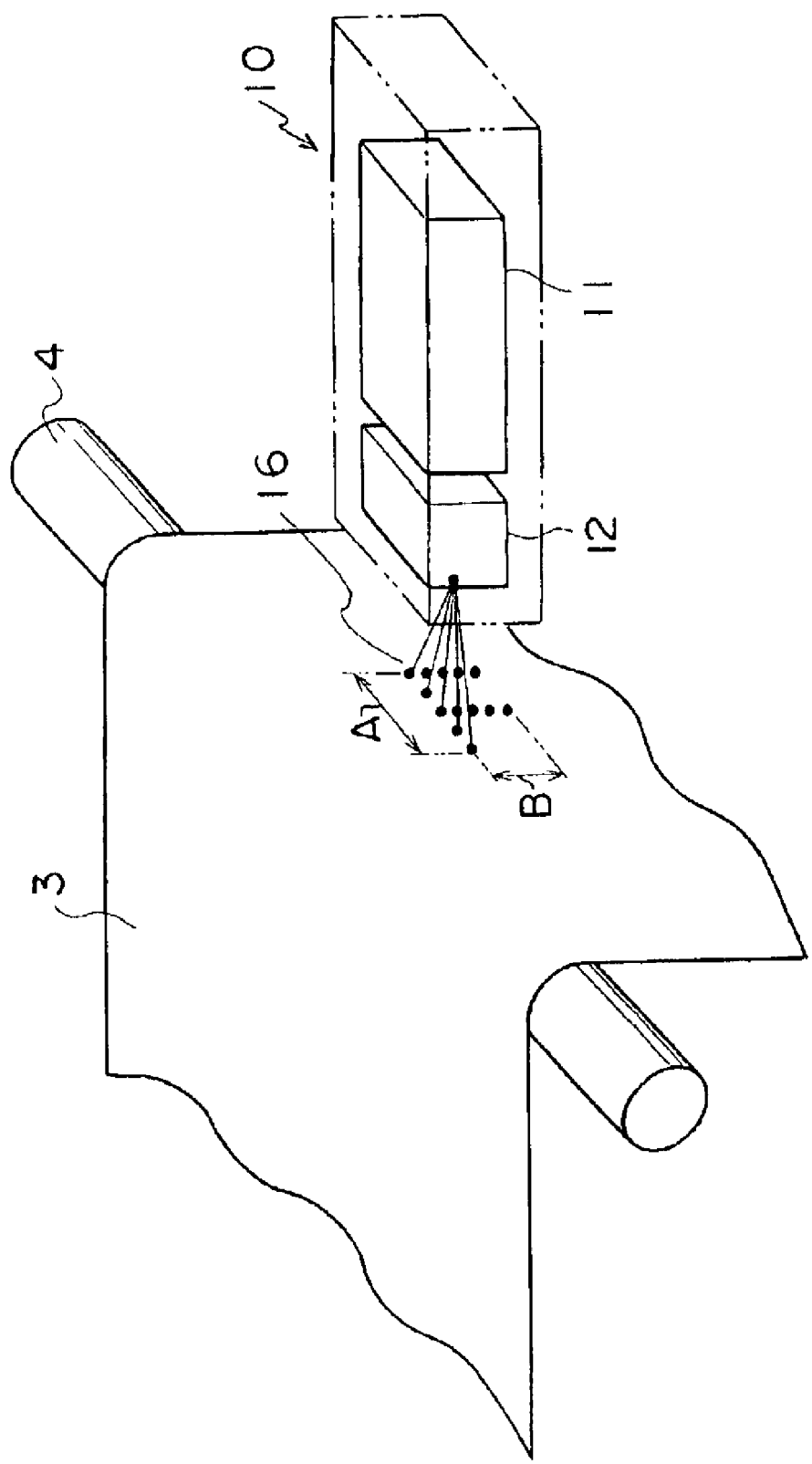
FIG. 2 is an explanatory diagram showing an example of marking of a character by an array of a dot pattern.

A printing pattern signal corresponding to a character or a mark to be recorded in the x-ray film 3 is inputted from the winding control device 7 to the laser control device 15. The laser control device 15 monitors a conveying length of the x-ray film 3 on a basis of the conveying pulse from the rotary encoder 8 while inputting the driving signal to the laser oscillator 11 on a basis of the printing pattern signal and inputs the deflection signal to the beam deflector 12 in order to operate each device. Consequently, as shown in FIG. 2, for example, the character of "F" is printed in 5×5 dots in a main scanning direction as a scanning direction of the laser beam 16 by the beam deflector 12 and in a sub-scanning direction as the conveying direction of the x-ray film 3.

When the laser beam is irradiated to an emulsion layer of the x-ray film 3, the emulsion layer is locally heated and melted, and melted traces become a dot pattern. In order to print the character or a sign represented by an array of the dot pattern in high quality, it is necessary to arrange each dot pattern at an almost constant diameter and to radiate the laser beam at a position where the conveying speed of the x-ray film 3 is kept at a certain constant. For this reason, as shown in FIG. 2, a laser beam 16 is irradiated at a position where the x-ray film 3 is lapped over the print roll 4 to keep a constant distance between the x-ray film 3 and the printhead 10 and the conveying speed of the x-ray film 3 corresponds to the peripheral speed of the suction drum 5. The laser beam 16 may be irradiated to x-ray film 3 on the print roll 4.

In a photosensitive material such as the x-ray film 3, almost all of areas of the photosensitive material are used for recording image, a space where the character or the mark is printed is narrow. For example, the x-ray film 3 is cut in a shape of a sheet to make a product, the character or the sign representing a manufacturer or a type is often printed along an edge of a film sheet. Since the character is stored in a certain size and the number of dots used for representing one character is restricted, an irradiation experiment of the laser beam was done by an experimental apparatus shown in FIG. 3 in order to study which dot pattern is effective in an increase of visibility.

Figure 3:
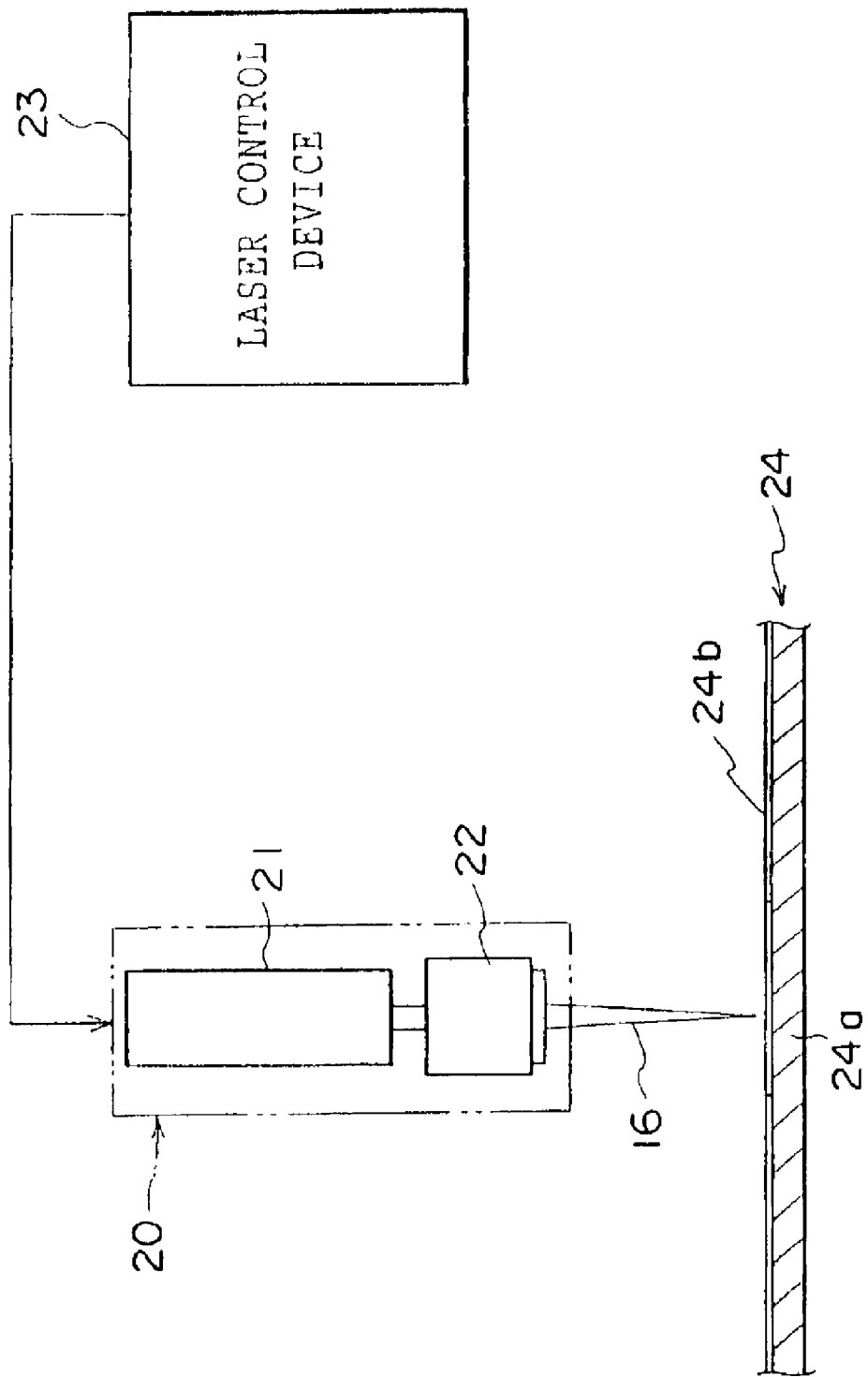
FIG. 3 is a schematic view of an experimental apparatus for evaluation of a dot pattern in a first embodiment.

In FIG. 3, a printhead 20 includes a laser oscillator 21 and a condensing lens 22, drive of the laser oscillator 21 is controlled by a laser control device 23. A $CO_2$ gas laser tube, which oscillation wavelength is variable by a grating utilizing a diffraction grating, is used as the laser oscillator 21, the oscillation wavelength and irradiation time of the laser beam (pulse width) can be adjusted by a control signal from the laser control device 23. The condensing lens 22 condenses the laser beam 16 about 4 mm in beam diameter irradiated from the laser oscillator 21 into about 0.2 mm in spot diameter at a front position 54 mm in distance from the condensing lens 22. An x-ray film 24 in a shape of a sheet is set as an evaluation sample at the condensed position.

Figure 4:
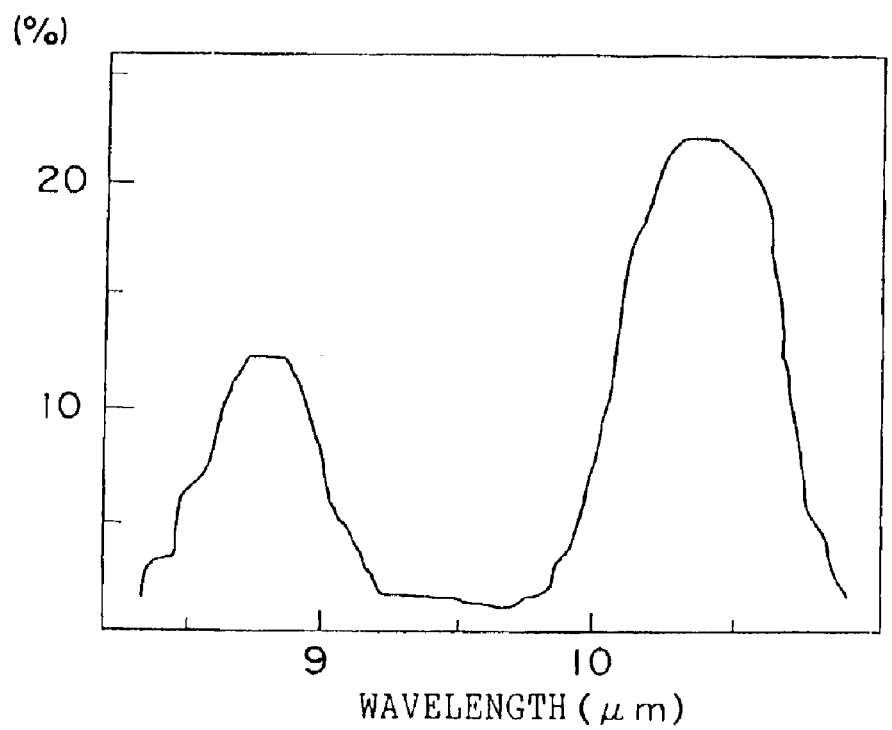
FIG. 4 is a graph showing a transmitted spectrum of an emulsion layer in a near infrared region.
Figure 5:
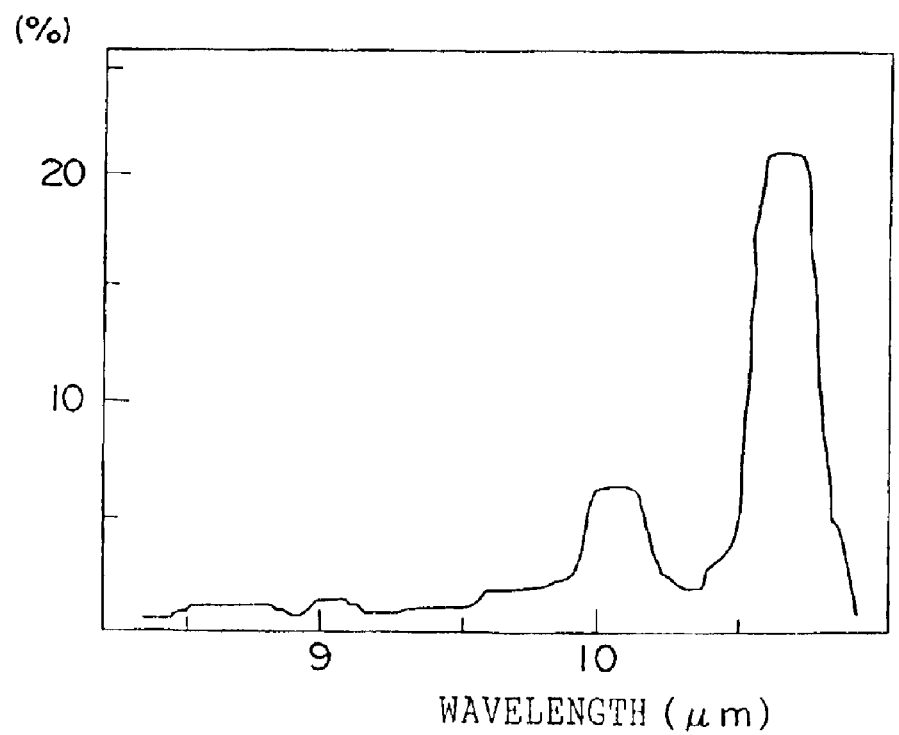
FIG. 5 is a graph showing a transmitted spectrum of a base layer in a near infrared region.

The x-ray film 24, in which a base layer 24a is made of PET (polyethylene terephthalate) about 175 $\mu$m in thickness and an emulsion layer 24b in the thickness range of about 2 $\mu$m to about 5 $\mu$m is coated on a surface of the base layer 24a, is used. In the laser oscillator 21, the oscillation wavelength is variable in the range of near infrared region from about 9 $\mu$m to about 11 $\mu$m. When a transmittance spectrum in the near infrared region of the base layer 24a and the emulsion layer 24b are measured beforehand, FIG. 4 and FIG. 5 show result of the measurement respectively. Because there is not a remarkable difference in reflectance between the base layer 24a and the emulsion layer 24b, both the base layer 24a and the emulsion layer 24b have larger absorption in the 9 $\mu$m band (not lower than 9 $\mu$m and less than 10 $\mu$m) than that in the 10 $\mu$m band (not lower than 10 $\mu$m and less than 11 $\mu$m).

It was confirmed whether identification of the dot pattern depends on the oscillation wavelength of the laser beam or not in a manner that the irradiation experiment is done by using the experimental apparatus shown in FIG. 3 while the oscillation wavelength of the laser beam 16 is varied. In the experiment, the irradiation time (pulse width) of the laser beam 16 is set at 10 $\mu$sec and the spot diameter of the laser beam 16 on the surface of the emulsion layer 24b is set at 0.2 mm. Table 1 shows experimental results.

TABLE 1

| Oscillation wavelength ($\mu$m) | Surface roughness ($\mu$m) | Visibility | Oscillation wavelength ($\mu$m) | Surface roughness ($\mu$m) | Visibility | Oscillation wavelength ($\mu$m) | Surface roughness ($\mu$m) | Visibility |
| --- | --- | --- | --- | --- | --- | --- | --- | --- |
| 9.1918 | 0.6 | ○ | 9.5360 | 0.8 | ○ | 10.289 | 0.1 | Δ |
| 9.2008 | 0.4 | Δ | 9.5525 | 0.8 | ○ | 10.303 | 0.1 | Δ |
| 9.2102 | 0.6 | ○ | 9.5692 | 0.6 | ○ | 10.318 | 0.1 | Δ |
| 9.2198 | 0.8 | ○ | 9.5863 | 0.4 | ○ | 10.334 | 0.1 | Δ |
| 9.2296 | 0.4 | ○ | 9.6037 | 1.0 | ○ | 10.349 | 0.1 | Δ |
| 9.2397 | 0.6 | ○ | 9.6213 | 0.8 | ○ | 10.365 | 0.1 | Δ |
| 9.2500 | 0.1 | Δ | 9.6392 | 0.8 | ○ | 10.381 | 0.1 | Δ |
| 9.2605 | 0.6 | ○ | 9.6575 | 0.6 | ○ | 10.441 | 0.1 | Δ |
| 9.2714 | 0.6 | ○ | 9.6760 | 0.4 | ○ | 10.453 | 0.1 | Δ |
| 9.2825 | 0.8 | ○ | 9.6950 | 0.8 | ○ | 10.476 | 0.1 | Δ |
| 9.2939 | 0.4 | ○ | 9.7141 | 0.6 | ○ | 10.494 | 0.1 | Δ |
| 9.3054 | 0.8 | ○ | 9.7337 | 0.4 | ○ | 10.513 | 0.1 | Δ |
| 9.3173 | 0.4 | ○ | 9.7534 | 0.6 | ○ | 10.532 | 0.1 | Δ |
| 9.3294 | 0.8 | ○ | 10.136 | 0.1 | Δ | 10.551 | 0.1 | Δ |
| 9.3418 | 0.6 | ○ | 10.147 | 0.1 | Δ | 10.571 | 0.1 | Δ |
| 9.3544 | 0.4 | ○ | 10.158 | 0.1 | Δ | 10.591 | 0.1 | Δ |
| 9.3674 | 0.8 | Δ | 10.170 | ※ | X | 10.611 | 0.4 | ○ |
| 9.3806 | 0.8 | ○ | 10.182 | 0.1 | Δ | 10.632 | 0.1 | Δ |
| 9.4289 | 0.6 | ○ | 10.194 | 0.1 | Δ | 10.653 | 0.1 | Δ |
| 9.4434 | 0.4 | ○ | 10.207 | 0.1 | Δ | 10.674 | 0.1 | Δ |
| 9.4581 | 1.0 | ○ | 10.220 | 0.1 | Δ | 10.696 | 0.1 | Δ |
| 9.4731 | 0.4 | Δ | 10.233 | 0.1 | Δ | 10.718 | 0.1 | Δ |
| 9.4884 | 0.6 | ○ | 10.247 | 0.1 | Δ | 10.741 | 0.1 | Δ |
| 9.5040 | 0.8 | ○ | 10.260 | 0.1 | Δ | 10.764 | ※ | X |
| 9.5198 | 1.0 | ○ | 10.274 | 0.1 | Δ | 10.787 | ※ | X |

※ data not available

The visibility in Table 1 shows a result that, in case of eye observation of each dot pattern, the dot pattern is evaluated as "○" in case that the dot pattern can be identified without regard to a direction of line of sight, the dot pattern is evaluated as "Δ" in case that it is difficult to identify the dot pattern dependent on the direction of the line of sight though existence of the dot pattern can be identified, and the dot pattern is evaluated as "X" in case that the dot pattern can not be identified at a glance. Mean surface roughness, which is thought that the mean surface roughness has large relationship to quality of the visibility, in the dot pattern area is measured, and the measurement values are shown in Table 1. The mean surface roughness is represented by a value, which arithmetically averages difference of elevation of minute concavities and convexities in a unit area of the dot pattern area.

From the above-described experimental results, it is confirmed that a setting of the oscillation wavelength at the 9 μm band from 9.1918 μm to 9.7534 μm is preferable to the visibility, and it is found that the measurement results of the surface roughness in this case almost exceed 0.1 μm. Because light scattering increases as increases the surface roughness, the dot pattern area is easily distinguished from surroundings. As for an area of a heat-melt part caused by the irradiation of the laser beam, the heat-melt part from the laser beam of the 10 μm band is smaller than from the laser beam of the 9 μm band. The reason is that the base layer 24a and the emulsion layer 24b have higher absorption efficiency in the laser beam of the 9 μm band than that of the 10 μm band, melting and evaporation are promoted in a surface portion irradiated directly by the laser beam to reduce conduction of heat energy to a periphery or inner portion of the surface portion irradiated directly. This operates effectively an increase of the surface roughness.

Furthermore, in order to study correlation between a size of the dot pattern and the visibility, the dot patterns having various diameters are formed by using the experimental apparatus shown in FIG. 3 to perform an eye observation. The diameter of the dot pattern is varied by adjusting a distance between the print head 20 and the x-ray film 24. The correlation between the diameter of the dot pattern and the visibility is shown in Table 2, the evaluation of the visibility is determined by the same criterion as Table 1. As shown in FIG. 2, when the laser beam is scanned to irradiate the x-ray film 3, the shape of the beam spot becomes from a perfect circle to a slightly compressed ellipse, however, with respect to the visibility, the slightly compressed ellipse can be regarded as the perfect circle.

TABLE 2

| dot diameter (μm) | visibility |
|---|---|
| –50 | X |
| 50–60 | X |
| 60–70 | X |
| 70–80 | X |
| 80–90 | ○ |
| 90–100 | ○ |
| 100–110 | ○ |
| 110–120 | ○ |
| 120–130 | ○ |
| 130–140 | ○ |
| 140–150 | ○ |
| 150–200 | ○ |
| 200–250 | ○ |
| 250–300 | ○ |
| 300–350 | ○ |
| 350–400 | ○ |
| 400–450 | ○ |
| 450–500 | Δ |
| 500– | X |

From the experimental results described above, it was able to be confirmed that the visibility is sufficient in case that the diameter of the dot pattern was in the range of 100 μm to 500 μm. However, when the size of one character is 2.5 mm by 2.5 mm and one character is represented by 5×5 dots, in case that the diameter of one dot pattern exceeds 500 μm, overlap with a adjacent dot is easy to generate, which largely prevents visibility. Accordingly, it is not preferable that the diameter of one dot pattern exceeds 500 μm.

(Embodiment)

On a basis of the experimental results, it is further studied by using the experimental apparatus shown in FIG. 3 which dot pattern is preferable as the dot pattern in case that the size of one character is 2.5 mm by 2.5 mm and one character is represented by 5×5 dots. Consequently, it was found that forms shown in FIG. 6 to FIG. 10 were superior in a point of the visibility and effective in prevention of generation of the unnecessary fog. A dot pattern shown in FIG. 11 shows a comparative example, the visibility is not sufficient and a defect of the fog is generated on a periphery of the dot pattern. Table 3 shows dot pattern data (diameter of dot pattern W, irregularity, and mean surface roughness of melted portion) and irradiation conditions (oscillation wavelength, irradiation time T, and beam profile) of the laser beam of samples 1 to 5 shown in FIG. 6 to FIG. 10 and the comparative example shown in FIG. 11. The beam profile represents irradiation energy in the beam spot area is Gaussian distribution type or a flat top type in which the irradiation energy is equal over the spot area.

TABLE 3

| | Dot pattern data | | | Irradiation condition | | |
|---|---|---|---|---|---|---|
| | Diameter (μm) | Irregularity (μm) | Surface roughness (μm) | Wavelength | Time T (μsec) | Profile |
| Sample 1 | 100–300 | 2–5 | 0.2–1.0 | 9 μm band | 5–15 | Flat top type |
| Sample 2 | 100–300 | 2–5 | 0.2–1.0 | 9 μm band | 5–15 | Gaussian distribution |

TABLE 3-continued

|  | Dot pattern data | | Surface roughness (μm) | Irradiation condition | | |
|---|---|---|---|---|---|---|
|  | Diameter (μm) | Irregularity (μm) |  | Wavelength | Time T (μsec) | Profile |
| Sample 3 | 300–500 | 2–5 | 0.2–1.0 | 9 μm band | 10–20 | Gaussian distribution |
| Sample 4 | 100–300 | 2–5 | 0.2–1.0 | 9 μm band | 3–5 | Gaussian distribution |
| Sample 5 | 100–300 | 2–5 | 0.2–1.0 | 9 μm band | 10–20 | Flat top type |
| Comparative sample | 80–95 | 10–50 | 0.1–0.2 | 10 μm band | 10–50 | Flat top type |

Figure 6:
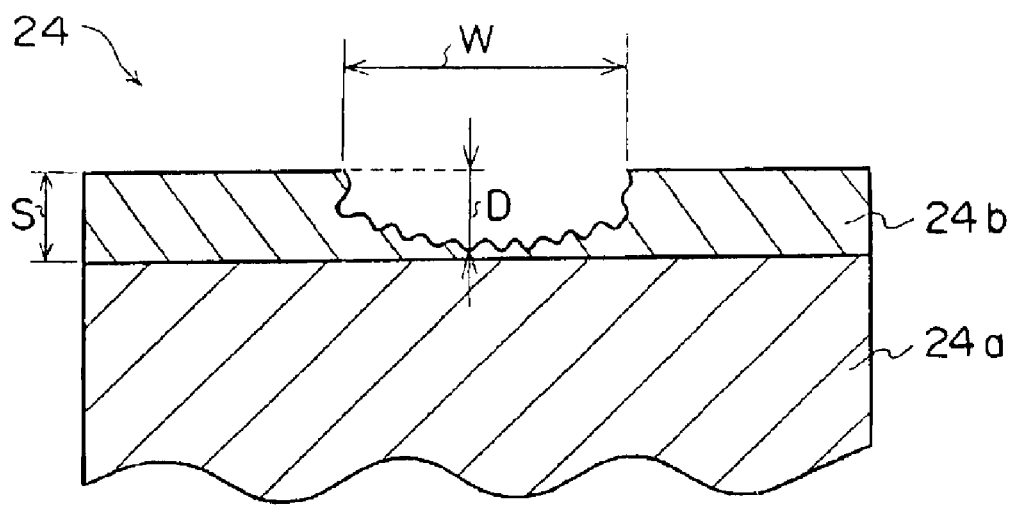
FIG. 6 is a central cross-sectional view showing an outline of a dot pattern of a sample 1.
Figure 7:
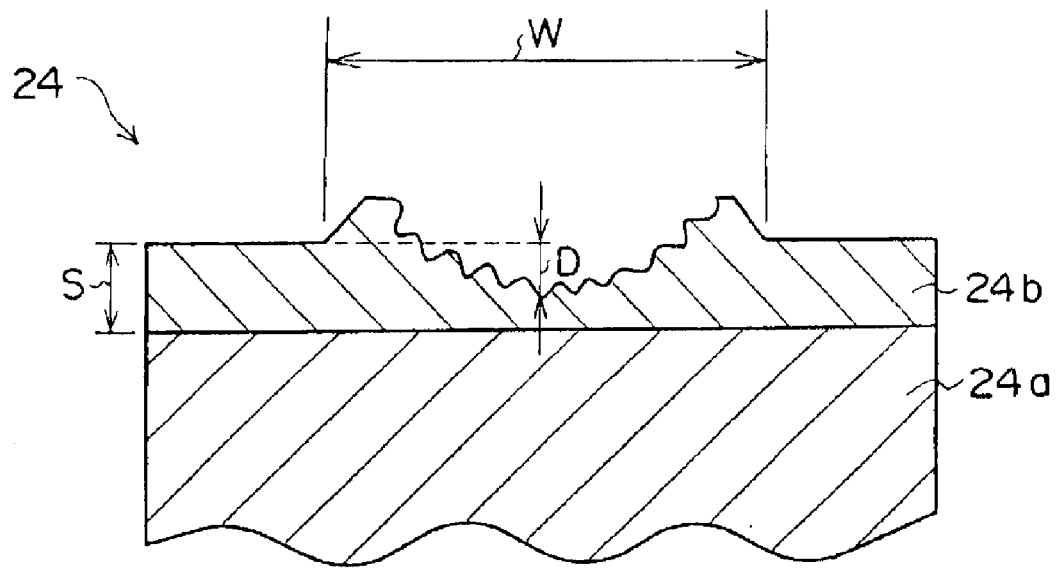
FIG. 7 is a central cross-sectional view showing an outline of a dot pattern of a sample 2.
Figure 8:
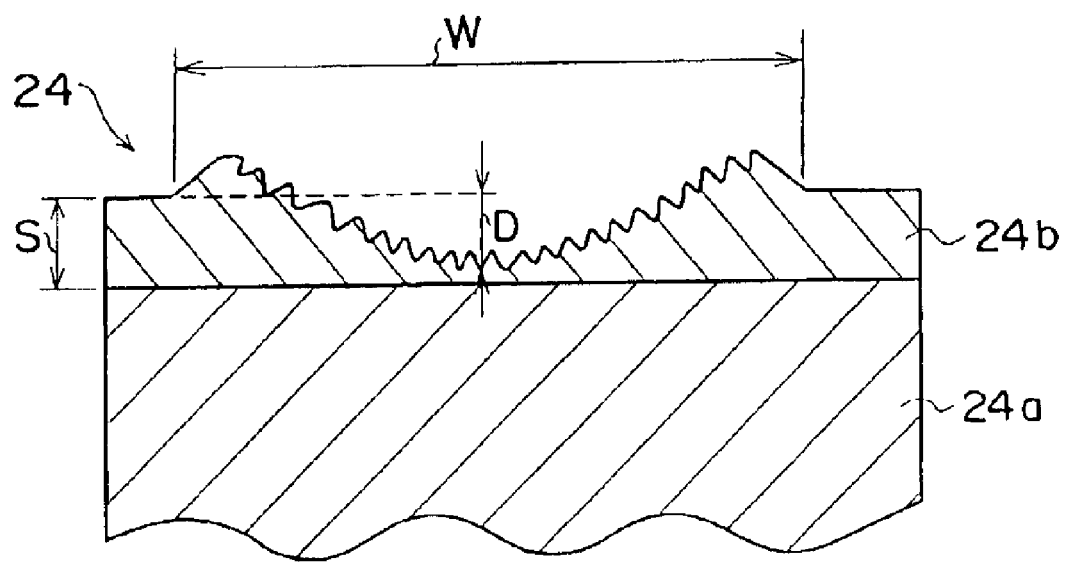
FIG. 8 is a central cross-sectional view showing an outline of a dot pattern of a sample 3.
Figure 9:
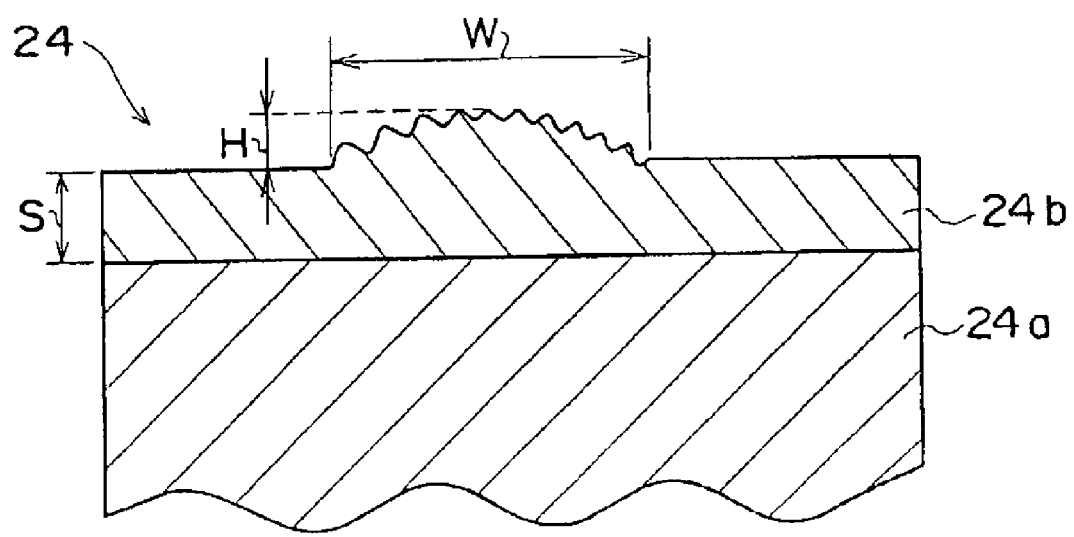
FIG. 9 is a central cross-sectional view showing an outline of a dot pattern of a sample 4.

The samples 1 to 3 have the dot pattern, which the emulsion layer 24b is melted and evaporated in a shape of a concavity having a depth D within a range not more than a thickness of the emulsion layer 24b respectively. As shown in FIG. 6, the sample 1 has the dot pattern, which only the emulsion layer 24b is roughly etched in a shape of a rectangle at in a cross-section. The sample 2 has the dot pattern which the heat-melted emulsion layer 24b swells slightly around the beam spot, in the sample 3, the beam spot is enlarged to 1 to 2 mm to extend the diameter W of the dot pattern and the energy density is relatively reduced.

In the sample 4, the irradiation of the laser beam is stopped at a state which the emulsion layer 24b is bumped by the irradiation of the laser beam and the emulsion layer 24b is set up again immediately before the emulsion layer 24b is evaporated, the dot pattern has a surface in a shape of a convexity. A height of the convexity H is not more than the thickness of the emulsion layer 24b. Though the visibility increases as increases the height of the convexity H, the dot pattern is easier to be damaged and broken in case of friction. With respect to the problem, in the sample 4, since the height of the convexity is controlled not more than the thickness of the emulsion layer 24b, the problem is hardly occurred, furthermore, the mean surface roughness is in the range of 0.2 μm to 1.0 μm, so that the sufficient visibility can be obtained.

Figure 10:
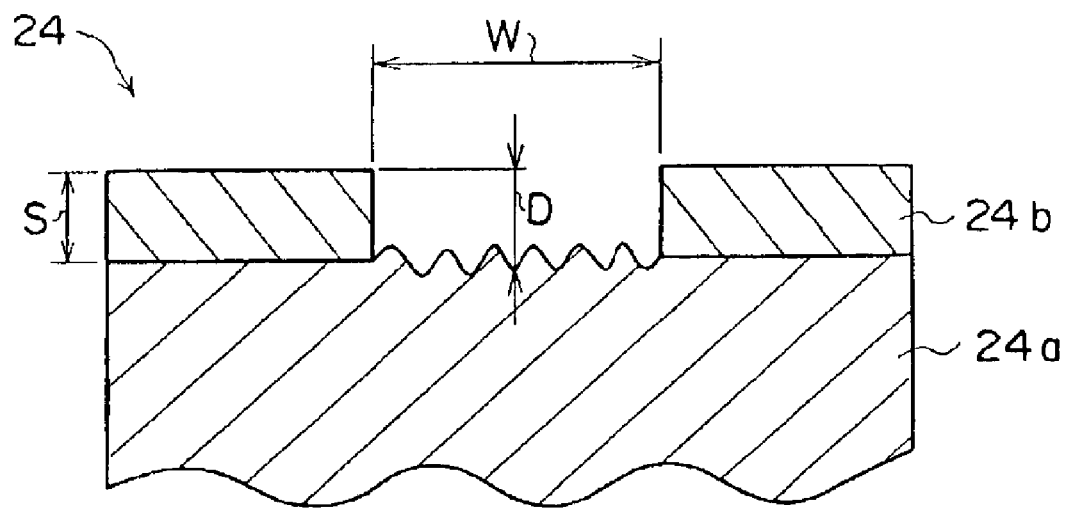
FIG. 10 is a central cross-sectional view showing an outline of a dot pattern of a sample 5.
Figure 11:
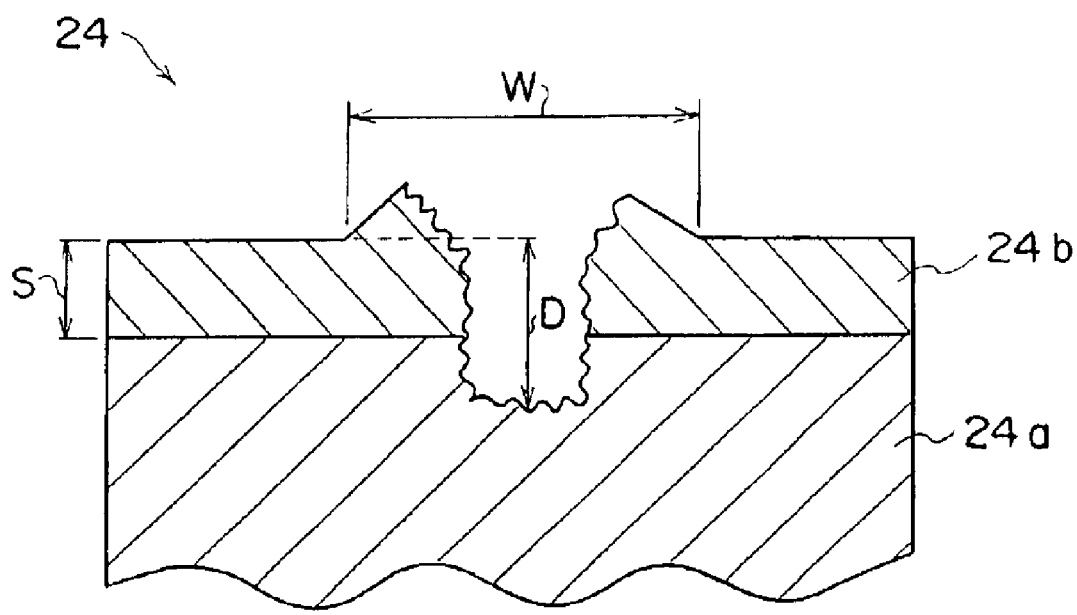
FIG. 11 is a central cross-sectional view showing an outline of a dot pattern of a comparative example.

The sample 5 has the dot pattern, which, as shown in FIG. 10, the emulsion layer 24b in an irradiation part of the laser beam is thoroughly melted and evaporated, and a surface potion of the base layer 24a is also melted and evaporated in a 10 μm depth.

Since the dot patterns of the samples 1 to 5 have sufficient diameter in the range of 100 μm to 500 μm and each surface has the mean surface roughness in the range of 0.2 μm to 1.0 μm, the dot patterns can be easily distinguished from surroundings in case of viewing. On the contrary, in the comparative example shown in FIG. 11, because not only the diameter W of the dot pattern is less than 100 μm and small but also the surface roughness is not sufficient, the identification by the viewing is difficult. The irregularity (depth) D is large and reaches to the base layer 24a. As a result, the laser beam is irradiated to impurities in the base layer 24a and the impurities emit light by the irradiation of the laser beam, so that the fog is easy to generate in the x-ray film 24 and the comparative example is not practical. In order to prevent the fog from the impurities in the base layer 24a, it is preferable that the irregularity between the photosensitive material, in which the emulsion layer having thickness S is formed on the surface of the base layer, and the dot pattern is not more than S+10 μm.

When the dot pattern having the good visibility and preventing the generation of the fog in the x-ray film is fixed, for example, the irradiation conditions of the laser beam given in Table 3 may be arranged. Preferably printing of the character or the sign can be stably done to the x-ray film in a manner that the printing of the dot pattern is done on the fixed irradiation conditions.

Though it is necessary that a minimum value of the diameter W of the dot pattern is not lower than 100 μm from a point of view of the visibility, a maximum value of the diameter W of the dot pattern can be enlarged by the size of one character and the number of dots representing one character. For example, when the size of one character is set at 5 mm by 5 mm and one character is represented by 5×5 dots, the maximum value of the diameter W of one dot pattern can be up to 1 mm in consideration of overlapping with an adjacent dot. That is to say, the dot patterns of one character are arrayed by an M number of a column and an N number of a row to form A×B in a size of length and width, the diameter W of the dot pattern can be enlarged not lower than 100 μm and not more than the smaller diameter either A/M or B/N. The mean surface roughness of the dot area may be in the range of 0.2 μm to 1.0 μm in order to maintain the good visibility of the dot pattern.

Though the embodiments are described according to the embodiments shown in figures, the invention is applicable to not only the x-ray film but also a negative or positive film such as a 135 film or a brownie film. The oscillation wavelength of the laser beam may be selected according to materials of the emulsion layer and the base layer, which constitute the photosensitive material.

Second Embodiment

Figure 12:
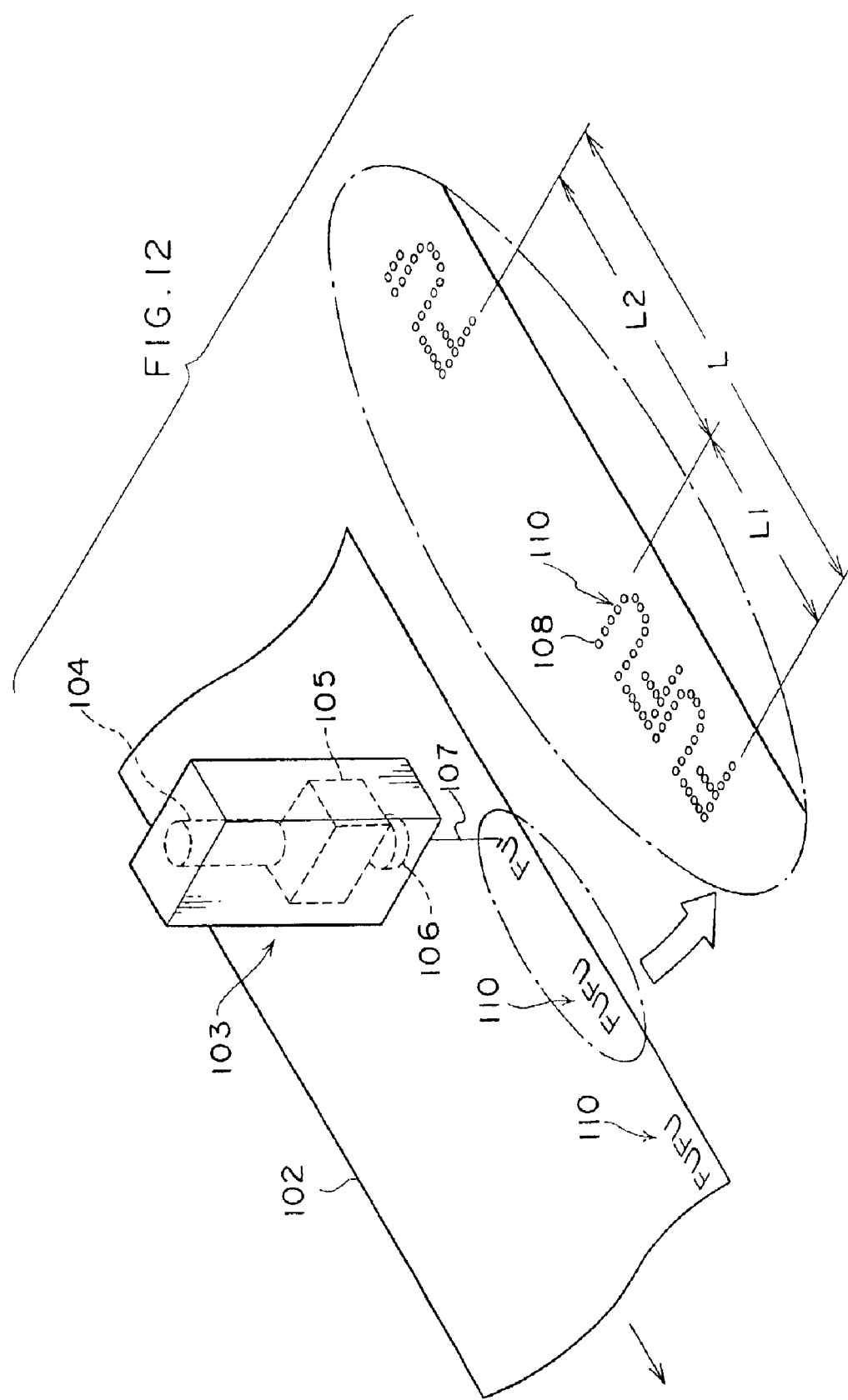
FIG. 12 is a schematic view of a printhead utilized for marking in a second embodiment.

FIG. 12 shows schematically a marking method according to a second embodiment. A printhead 103 is provided opposing to an emulsion layer side of a photosensitive material 102 in a shape of a web. The photosensitive material 102 is conveyed at a constant speed in an arrow direction, driving of the printhead 103 is controlled synchronizing the conveyance. The printhead 103 has a laser oscillating tube 104, an acousto-optic device 105, and a condensing lens 106, and irradiates a laser beam 107 onto a surface of the emulsion layer of the photosensitive material 102.

Single carbon dioxide gas laser is used as the laser oscillating tube 104 and radiates a continuous laser beam into the acousto-optic device 105 while a printing pattern of one unit is printed. The acousto-optic device 105, responsive to a deflection input signal, deflects the laser beam in a perpendicular direction to a conveying direction of the photosensitive material 102 to make the laser beam having a certain pulse width, and the laser beam is incident to the condensing lens 106. The condensing lens 106 emits the laser beam being incident from the acousto-optic device 105 as a laser beam 107 condensed on a surface of the photosensitive material 102.

When the laser beam 107 is irradiated at a certain pulse width to the photosensitive material 102, a part of the emulsion layer or a film base of the photosensitive material 102 is melted to form a dot pattern 108. The dot pattern 108, which is described in detailed later, appears as a concave and convex portion on the surface of the photosensitive material 102. When the laser beam 107 is scanned intermittently in the perpendicular direction to a conveying direction of the photosensitive material 102 at a sufficiently faster scanning speed compared with the conveying speed of the photosensitive material 102 and laser beam 107 is irradiated to the photosensitive material 102 at each scanning position and at a certain pulse width, a polarity of dot patterns 108 can be arrayed in the perpendicular direction to a conveying direction as shown in FIG. 12. Since an M×N dot pattern array is obtained by repeating the same procedure synchronizing the conveyance of the photosensitive material 102, it is possible to print a character or a pattern on the surface of the photosensitive material 102.

In the example shown in FIG. 12, "FUFU" of a length of characters L1 is taken to be a printing pattern 110 of a unit while one character is represented by six dots in a column and five dots in a row, its printing pitch is taken to be L, and a distance between adjacent printing patterns is taken to be L2 (L=L1+L2). In consideration of printing quality and visibility, it is necessary that adjacent dot patterns 108 are separated at a certain distance without overlapping, a sufficient concavity and convexity is appeared in the emulsion layer, and there is few fogs in a periphery of the dot pattern. The visibility described here is determined by a criterion whether the printing pattern 110 is properly identified by reflected light or not even though the photosensitive material 102 is developed in any concentration.

The visibility of the dot pattern 108 itself becomes better as increases a degree of irregularity (surface roughness) appeared on a surface of the emulsion layer, energy density of the laser beam 107 is increased or the pulse width is lengthened so as to increase the degree of the irregularity. However, the fog is easy to generate in the periphery of the dot pattern 108 as the energy density of the laser beam 107 is increased or the pulse width is lengthened. There are two kinds of the fog, namely one is that surrounding dust is irradiated by the laser beam 107 to be heated and light generated by the heating results in the fog, the other is when light, which is generated by heating impurities mixed in the film base, results in the fog. With respect to the fog from the surrounding luminous dust, it is possible to improve the fog by blowing inert gas such as Ar with irradiation of the laser beam 107 or maintaining a clean environment, however with respect to the fog from luminous impurities in the film base, it is very difficult to improve the fog in the present state.

By taking a technique, which the laser beam 107 is finely concentrated in a minute area to irradiate, not only the emulsion layer but also the film base beneath the emulsion layer are eroded deeply. Accordingly, a probability, which the laser beam 107 irradiates the impurities mixed randomly in the base film, is increased, which causes the fog to be generated in a wide area of a periphery of an irradiating position.

Figure 13:
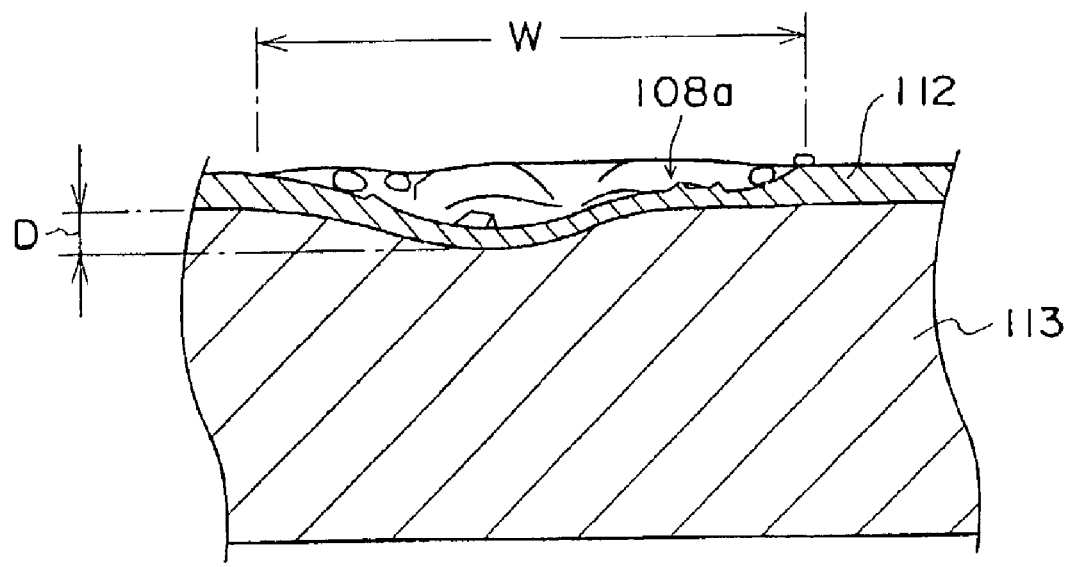
FIG. 13 is a schematically cross-sectional view showing an example of a dot pattern.
Figure 14:
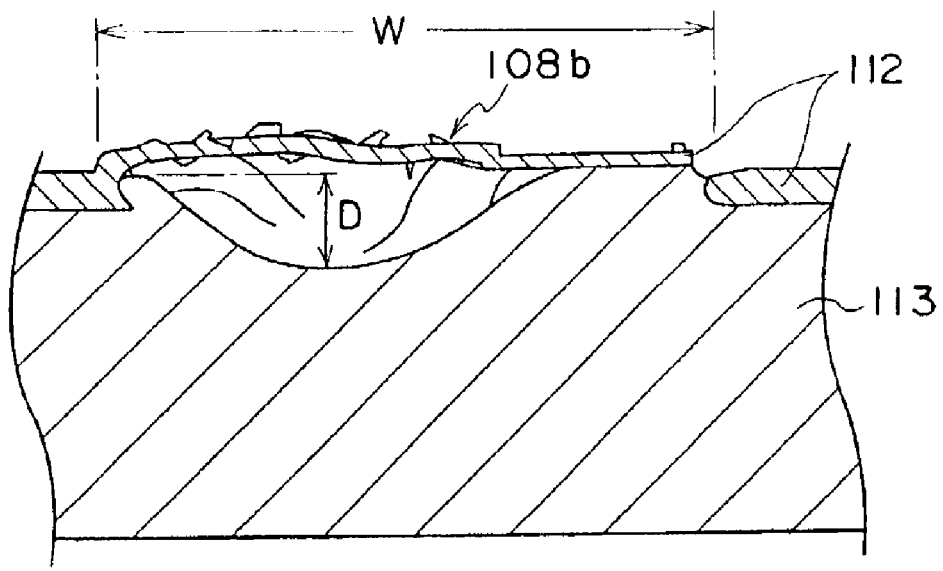
FIG. 14 is a schematically cross-sectional view showing another example of a dot pattern.
Figure 15:
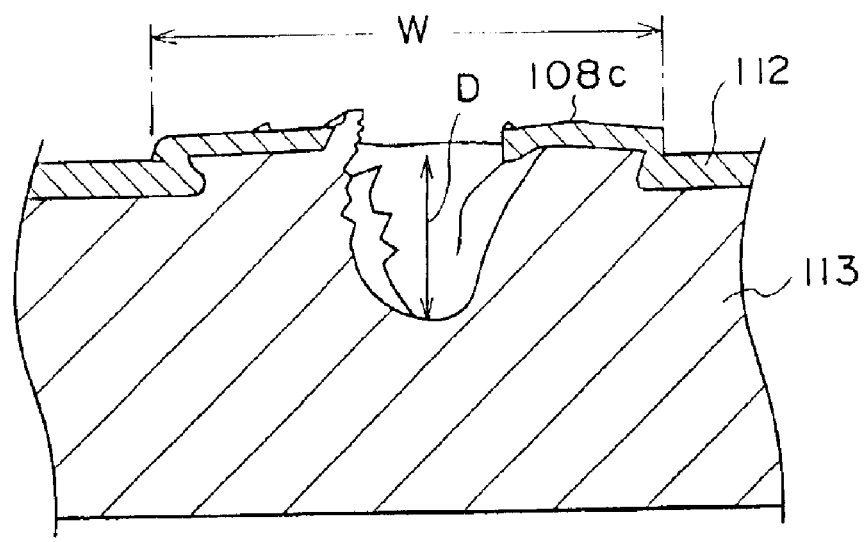
FIG. 15 is a schematically cross-sectional view showing still another example of a dot pattern.

FIG. 13 to FIG. 15 show shapes of the dot patterns when an x-ray film is used as the photosensitive material 102 and the laser beam 107 is irradiated from an emulsion side at various irradiating conditions. A planar shape of each dot pattern is almost a circle, each figure shows a schematic illustration in case that each central cross-section is observed with a microscope. In a dot pattern 108a shown in FIG. 13, a minute concavity and convexity appears on a surface of an emulsion layer 112, on the whole the dot pattern 108a is slightly concave. An outer diameter W of the concavity is about 90 $\mu$m, all the area of the concavity is covered with the emulsion layer 112. Right beneath the dot pattern 108a, a gentle concavity is formed in a film base 113, a depth D of the concavity is about 5 $\mu$m. The dot pattern 108a has the good visibility and the fig is not generated in a periphery of the dot pattern 108a.

FIG. 14 shows a dot pattern obtained in case that the irradiation energy of the laser beam 107 is larger than that in forming the dot pattern 108a. Though the dot pattern 108b is covered with the emulsion layer 112 having a minute concavity and convexity on its surface, a concave portion is formed in the film base 113 right beneath the emulsion layer 112, the depth D of the concave portion reaches 10 $\mu$m. The outer diameter W of the dot pattern 108b is about 110 $\mu$m, it is found that the fog is generated in the periphery of the dot pattern 108b.

When the irradiation energy of the laser beam 107 is further increased, a shape of a dot pattern shown in FIG. 15 is obtained. In this dot pattern 108c, the emulsion layer 112 of the surface of the pattern is eliminated and a concave portion of the film base 113 is exposed to the surface. The outer diameter W of the whole dot pattern is 140 $\mu$m, a diameter of the concave portion formed in the film base 113 is about 30 $\mu$m, and the depth D of the concave portion is about 30 $\mu$m. It is also found that the fog is generated in the periphery of the dot pattern 108c.

Observing the shape of the dot pattern 108 and generating conditions of the fog with the above-described observation results, in the dot patterns having the good visibility, there is a similarity that not only the surface of the emulsion layer is sufficiently rough but also the concave portion is formed in the film base 113. It is found that, in the dot patterns having the influence of the fog, the dot patterns have the concave portion exceeding 10 $\mu$m in depth in the film base. From the information, it is confirmed that the dot patter 108 has the good visibility and the influence of the fog can be effectively restrained, when the dot pattern 108 is formed so that the depth of the concave portion formed in the film base is in a range of 3 $\mu$m to 10 $\mu$m. In order to keep the good visibility, it is desirable that the depth of the concave portion of the film base is in the range of 3 $\mu$m to 10 $\mu$m for all dot patterns constituting the character or the mark, however, when 80% of the total number of the dot patterns are visible as the dot pattern, the character or the sign can be identified.

Generally a layer structure, a thickness, and a material of the emulsion layer 112 or the film base 113 are varied by a type of the photosensitive material 102, when the laser beam from the carbon dioxide gas laser tube is irradiated, the energy of the laser beam is not always absorbed by the photosensitive material 102. In case that a backside of the photosensitive material 102 is supported at the irradiated position of the laser beam 107 by a suction belt or a metal roll, it is anxious that the laser beam 107 is irradiated to a minute foreign body between the suction belt or the metal roll and the photosensitive material, and a luminous phenomenon is generated to occur the fog.

Figure 16:
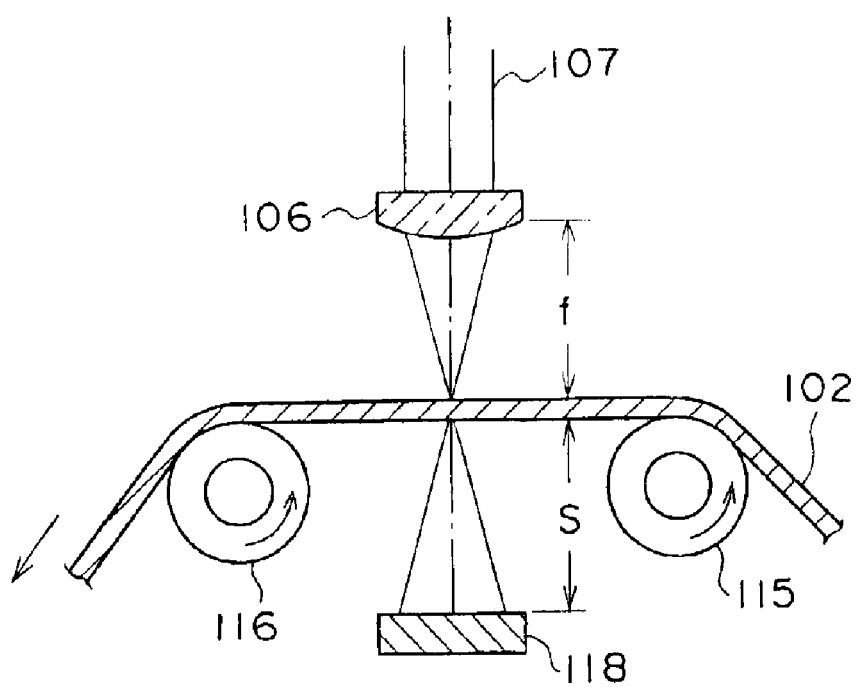
FIG. 16 is an explanatory view showing an example which marking is done between a pair of pass rolls.
Figure 17:
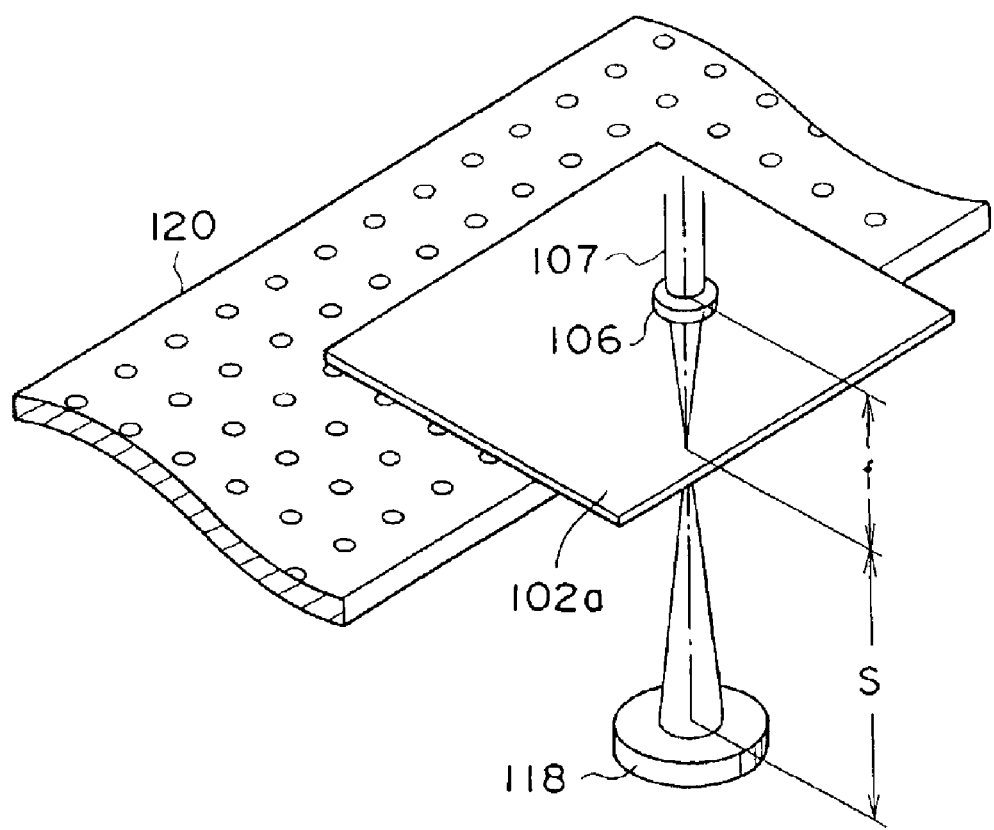
FIG. 17 is an explanatory view showing an example which marking is done while a photosensitive material is conveyed by a suction belt.

As shown in FIG. 16 or FIG. 17, it is effective against this problem that the photosensitive material is floated in the air in an area where the laser beam 107 is scanned. In an embodiment shown in FIG. 16, the photosensitive material 102 in a shape of a continuous sheet is supported in the air by a pair of pass rolls 115 and 116 for conveying, the laser beam 107 is irradiated between the pair of pass rolls 115 and 116. The laser beam 107 is irradiated in a shape of a spot on the surface of the photosensitive material 102 through the condensing lens 106 having a focal distance f, the laser beam 107 is scanned by the acousto-optic device 105 (not shown) in a perpendicular direction to the conveying direction of the photosensitive material 102.

When the laser beam 107 is irradiated in such a configuration, since the laser beam that is not absorbed by the photosensitive material 102 passes through the photosensitive material 102, the fog from the luminous minute foreign body adhered to a surface of a member supporting the backside of the photosensitive material 102 can be prevented. As shown in FIG. 16 and FIG. 17, when the laser beam, which transmits the photosensitive material 102, is absorbed by an absorption member 118 such as a carbon plate, a position where the absorption member 118 is placed may be separated from the photosensitive material 102 by distance S (>f). This prevents the luminous phenomenon because the energy density is low, even though the minute foreign body exists on the surface of the absorption member 118.

In case that the printing is done to the photosensitive material 102 between the pair of pass rolls 115 and 116, when the photosensitive material 102 is bent between the rolls, since the printing quality is reduced by varying a degree of condensation of the laser beam 107, it is desirable that tension not lower than about 0.1 kg/cm per unit width is given to the photosensitive material 102 between the pass rolls 115 and 116.

FIG. 17 shows an embodiment in case that printing is done to a photosensitive material 102a in a shape of a sheet. The photosensitive material 102a cut in a product size is conveyed in an arrow direction with the photosensitive material 102a absorbed on a surface of a suction belt 120, which many air suction openings are provided in the surface. One edge portion to be printed of the photosensitive material 102a is stuck out from the suction belt 120, the laser beam 107 is irradiated to the edge portion during scanning. Accordingly, like the embodiment shown in FIG. 16, it is not anxious that the fog is generated by the laser beam 107, which transmits the photosensitive material 102a. When the laser beam 107, which transmits the photosensitive material 102a, is absorbed by the absorption member 118, it is desirable that the distance S from the photosensitive material 102a to the absorption member 118 is set at longer than the focal distance f of the condensing lens 106.

Though generally the laser beam at a wavelength of 10.6μm is obtained from the carbon dioxide gas laser tube, when the laser beam having a shorter wavelength, for example, when the laser beam having a wavelength of 9.2 μm is utilized, energy absorption is increased at the surface of the photosensitive material. This causes the laser beam, which reaches the film base 113, or the laser beam, which transmits the film base 113 to be reduced. Consequently it is effective that the visibility of the printing is maintained well while the luminous phenomenon from the minute foreign body in the film base or in the backside of the film base can be restrained.

The acousto-optic device 105 used for scanning the laser beam 107 deflects the laser beam by utilizing variation of refractive index, which is generated by deformation of a piezoelectric crystal when a high-frequency signal is applied to the piezoelectric element to make a supersonic vibration. The piezoelectric crystal generates heat by the irradiation of the laser beam 107. Response characteristics are varied by the heat, and deflection of the laser beam to the inputted high-frequency signal is varied. It is necessary that rise in temperature of the piezoelectric crystal is prevented in order to restrain the variation. In the invention, it is contrived that sufficient cooling time is secured by restraining laser oscillation time to total printing time not more than 70%.

EXAMPLE

AS shown in FIG. 12, the laser beam having a wavelength of 10.6 μm generated from single carbon dioxide gas laser tube 104 is incident to the acousto-optic device 105, the laser beam 107 irradiated from the acousto-optic device 105 is condensed by the condensing lens 106 (f=82.5 mm) to form the dot pattern 108 in the emulsion layer of the photosensitive material 102. A medical x-ray film for direct radiography (product of Fuji Photo Film Co., Ltd, product name: Super HR-G30) is used as the photosensitive material 102. Output power of the laser tube is 100 W, amount energy measured on a basis of the laser beam 107 irradiated from the acousto-optic device 105 in continuous oscillation is 84 W.

Because the laser beam used in actual printing is deflected by the acousto-optic device to be a shape of a short pulse, it is difficult to measure the actual energy density in printing. Though the energy density heavily depends on a build up characteristic of the laser tube 104 and deflection efficiency of the acousto-optic device 105, when the energy density is estimated from the energy amount in continuous oscillation and the dot pattern 108 formed by the energy amount, the energy density is about $4.18 \times 10^5$ W/cm$^2$. On the conditions described above, the dot pattern is formed in order to print while the pulse width is varied, the depth D of the concave portion formed in the film base 113, the visibility of the character, and the fog are investigated. The results are shown in Table 4.

TABLE 4

| Pulse width (μS) | Depth of dot (μm) | Visibility of character | Generation of fog |
|---|---|---|---|
| 8 | 0 | X | Not occur ○ |
| 10 | 3 | Δ | Not occur ○ |
| 13 | 5 | ○ | Not occur ○ |
| 16 | 9 | ○ | Not occur ○ |
| 19 | 18 | ○ | Occur X |
| 22 | 26 | ○ | Occur X |
| 25 | 31 | ○ | Occur X |
| 28 | 38 | ○ | Occur X |

Table 5 and Table 6 show results forming the dot pattern 108 with varying focal distance of the condensing lens 106 of 89 mm and 95 mm on the same irradiation conditions of the laser beam. By varying the focal distance of the condensing lens 106, the estimated energy density is also varied, the estimated energy density is about $3.0 \times 10^5$ W/cm$^2$ in Table 5, and the estimated energy density is about $2.0 \times 10^5$ W/cm$^2$ in Table 6.

TABLE 5

| Pulse width (μS) | Depth of dot (μm) | Visibility of character | Generation of fog |
|---|---|---|---|
| 8 | 0 | X | Not occur ○ |
| 10 | 0 | X | Not occur ○ |
| 13 | 4 | ○ | Not occur ○ |
| 16 | 7 | ○ | Not occur ○ |
| 19 | 10 | ○ | Not occur ○ |
| 22 | 15 | ○ | Occur X |
| 25 | 24 | ○ | Occur X |
| 28 | 30 | ○ | Occur X |

TABLE 6

| Pulse width (μS) | Depth of dot (μm) | Visibility of character | Generation of fog |
|---|---|---|---|
| 8 | 0 | X | Not occur ○ |
| 10 | 0 | X | Not occur ○ |
| 13 | 3 | Δ | Not occur ○ |
| 16 | 6 | ○ | Not occur ○ |
| 19 | 8 | ○ | Not occur ○ |
| 22 | 13 | ○ | occur Δ |
| 25 | 18 | ○ | occur X |
| 28 | 25 | ○ | occur X |

The measurement results are shown in Table 7 when the focal distance of the condensing lens 106 is set at 127 mm and the pulse width is set at longer. The estimated energy density is about $7.0 \times 10^4$ W/cm².

TABLE 7

| Pulse width (μS) | Depth of dot (μm) | Visibility of character | Generation of fog |
|---|---|---|---|
| 19 | 0 | X | Not occur ○ |
| 22 | 3 | Δ | Not occur ○ |
| 25 | 5 | ○ | Not occur ○ |
| 30 | 7 | ○ | Not occur ○ |
| 37 | 12 | ○ | Occur Δ |
| 44 | 19 | ○ | Occur X |
| 52 | 26 | ○ | Occur X |
| 60 | 32 | ○ | Occur X |

In Table 4 to Table 7, the visibility of the character is evaluated as "○" in case that the visibility of the character can be identified without regard to a direction of line of sight, the visibility of the character is evaluated as "Δ" in case that it is difficult to identify the visibility of the character dependent on the direction of the line of sight though existence of the visibility of the character can be identified, and the visibility of the character is evaluated as "X" in case that the visibility of the character can not be identified at a glance. On the other hand, with respect to the fog, the fog is evaluated as "○" in case that the fog can not be visible, the fog is evaluated as "Δ" in case that the fog appears without affecting the visibility of the character, and the fog is evaluated as "X" in case that the fog affects the visibility of the character. From these results, it is confirmed that, when the depth D of the concave portion formed in the film base 113 is in the range of 3 μm to 10 μm, the visibility of the character is good and the fog is not generated.

However, the condensing lens used for printing might be restricted by a size or character style of the character or mark to be printed or the pulse width might be restricted by a processing cycle of a marking process, when the printing condition is varied so as to obtain the proper dot pattern 108 for each kind of the photosensitive material 102, it is proper that a parameter, which does not affect other irradiation condition such as change of the condensing lenses 106 and adjustment of the pulse width of the laser beam, is adjusted. As the parameter described above, there is another technique which quantity of light of the laser beam is adjusted in passing the acousto-optic device 105, the printing condition can be varied by adjusting the high-frequency signal inputted to the acousto-optic device 105.

As shown in FIG. 12, when the printing pattern 110 having a character length L1 is one unit and the printing is done in order at a printing pitch L while a distance L2 is maintained, the laser beam becomes a continuously irradiated state while the printing pattern 110 is printed. In order to avoid over-heat the acousto-optic device 105, there maybe sufficient cooling time between completion of the printing pattern 110 of one unit and the start of the printing of the next printing pattern 110. The visibility of the character is tested in a manner that the photosensitive material 102 is conveyed at constant conveying speed, the character length L1 of the printing pattern 110 is fixed at 60 mm, and the printing is done while the printing pitch (L1+L2) is varied by varying the distance L2.

In this test, the output power of the laser tube is 100 W, the amount of energy of the laser beam irradiated from the acousto-optic device 105 in the continuous oscillation state is 84 W, and the condensing lens having the focal distance f of 82.5 mm is used. The printing is done while the pulse width per dot pattern is 13 μm. The evaluation result is shown in Table 8.

TABLE 8

| Cycle pitch of a string of characters (mm) | Length of a string of characters/ cycle pinch of a string of characters | Visibility of character |
|---|---|---|
| 60 | 100 | only readable in printing start stage X X |
| 70 | 86 | only readable in each starting portion of sentence X X |
| 80 | 75 | Illegible in each latter portion of a sentence X |
| 90 | 67 | Slightly thin in each latter portion of a sentence ○ |
| 100 | 60 | Good ⊚ |
| 120 | 50 | Good ⊚ |

As can be seen from Table 8, when the ratio of the character length L1 the printing pattern 110 to the printing pitch represented by L1+L2 exceeds about 70%, the sufficient cooling time can not be taken. When the printing is continued, the effect becomes more remarkable. Accordingly, in order to print continuously with the photosensitive material 102 conveyed at a constant speed while responsibility of the acousto-optic device 105 is maintained well, it is effective that the ratio of the character length L1 of the printing pattern per unit to the printing pitch (L1+L2) is restrained not more than 70%.

When the printing is done while the conveying speed of the photosensitive material 102 is varied, particularly when the photosensitive material 102 can be conveyed at lower speed during the conveyance of the distance L2, the character length L1 is not always restrained 70% of the printing pitch. However, even in this case, it is necessary that the irradiation time of the laser tube required for the printing of one unit of the printing pattern is restrained not more than 70% to repeating period of the printing required for conveying the photosensitive material 102 by the printing pitch of L1+L2.

As shown in FIG. 16, when the printing is done with the photosensitive material 102 floated in the air by the pair of pass rolls 115 and 116, as described above, it is necessary that the proper tension is given to the photosensitive material 102 between the pass rolls 115 and 116. A test was done in order to confirm a relation between a degree of the tension and the printing quality. In the same way as the antecedent test, the output power of the laser tube is 100 W, the amount of energy of the laser beam irradiated from the acousto-optic device 105 in the continuous oscillation state is 84 W, and the condensing lens having the focal distance f of 82.5 mm is used. The pulse width per dot pattern is 13 μm. The printing is done while the tension per unit width is varied, the shape of the dot pattern 108 is observed. The result is shown in Table 9.

TABLE 9

| Web tension per width (kg/cm) | Web behavior | Printing quality |
| --- | --- | --- |
| 0.05 | Behavior in cross direction is unstable at acceleration, deceleration, and low speed X | Dots are not uniform X |
| 0.08 | Flutter of web occurs in acceleration and deleration portion X | Dots are not uniform X |
| 0.1 | Stable ○ | Good ○ |
| 0.15 | stable ○ | Good ○ |

In the above-described test, the medical x-ray film for direct radiography (product of Fuji Photo Film Co., Ltd, product name: Super HR-G30) is used as the photosensitive material 102. It is confirmed that the tension between the pass rolls 115 and 116 is required to be not lower than 0.1 kg/cm. In case of the excess tension, contact surface pressure between the photosensitive material 102 and the pass rolls 115 and 116 becomes too higher, it is anxious that quality of the photosensitive material itself is deteriorated, so that the tension is preferably restrained up to at most about 0.5 kg/cm. In order to maintain constantly the tension of the photosensitive material 102 between the pass rolls 115 and 116, while the photosensitive material 102 is conveyed without slipping by the suction drum provided at a downstream side of the pass roll 116, a load may be given to the conveyance of the photosensitive material 102 at an upstream side of the pass roll 115. The value of the tension is applicable to not only the medical x-ray film but also a general photosensitive material, which the emulsion layer is coated on the plastic film base.

As shown in FIG. 17, the suction belt 120 is usable, when a sandwich type of belt which the photosensitive material is conveyed with the photosensitive material inserted between a surface side and a backside is used, the photosensitive material may be conveyed while the edge portion of the printing side of the photosensitive material is stuck out from the belt, the problem of the tension is not generates. Generally, since the printing is done in an area within about 3 mm from one edge of the photosensitive material, 10 mm is enough for quantity of sticking out from the belt.

Though, in the embodiment described above, the laser beam radiated from the single laser tube is scanned in a sub-scanning direction perpendicular to the conveying direction of the photosensitive material by utilizing the acousto-optic device, the same printing can be done without using the acousto-optic device in a manner that a plurality of laser tubes is arranged corresponding to the number of dots of the sub-scanning direction, the laser beam is selectively radiated by these laser tubes to do the printing. However, there is dispersion among response characteristics of the plurality of laser tubes, in case that the laser tubes are used directly, the size of the dot pattern or the depth of the concave portion formed in the film base is not constant, which causes the printing quality to be reduced. Accordingly, when the condensing lens is provided in each laser tube, the focal distance is varied according to the characteristics of the laser tubes or the pulse width is adjusted, and the desirable dot pattern is obtained, the good printing can be done without the fog.

Third Embodiment

Figure 18:
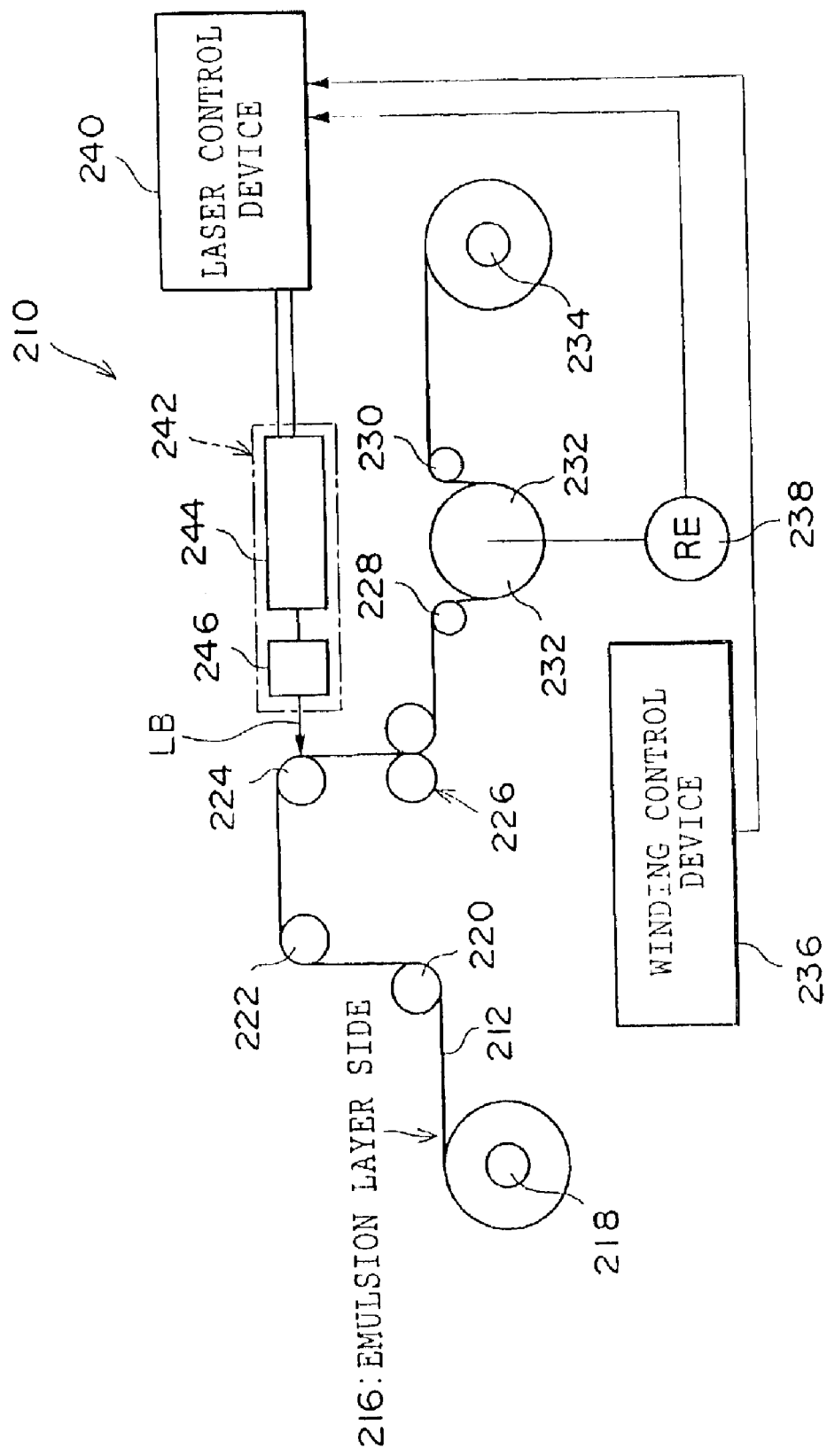
FIG. 18 shows a schematic configuration of a marking apparatus according to a third embodiment.

FIG. 18 shows a schematic illustration of a marking apparatus 210 according to a third embodiment.

The marking apparatus 210 forms a marking pattern such as a character or a sign in a manner that a laser beam (light beam) is irradiated to a surface of an x-ray film (photosensitive material) 212 of a continuous sheet wound in a shape of a roll during a process, which the x-ray film 212 is conveyed.

Figure 19:
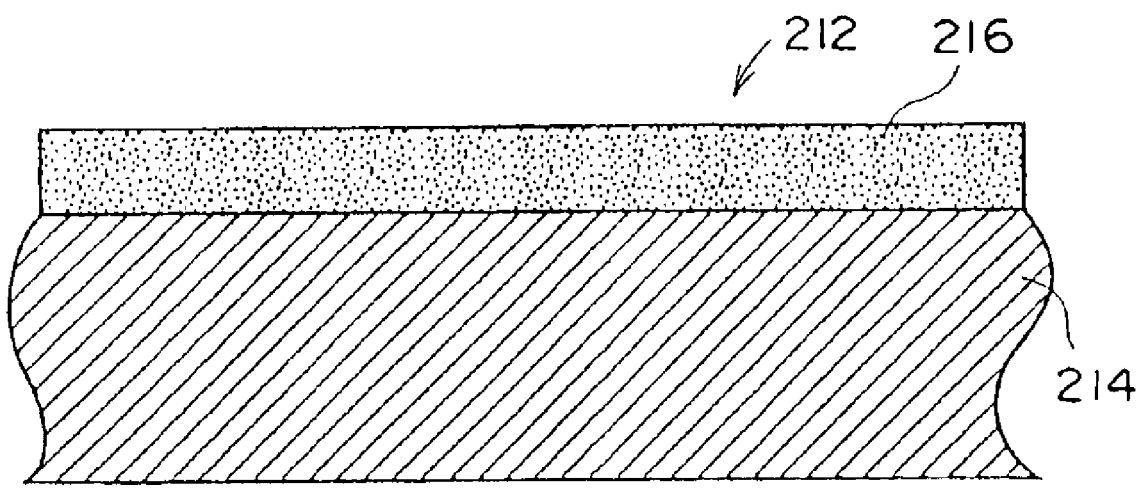
FIG. 19 is a cross-sectional view of a photosensitive material.
Figure 20:
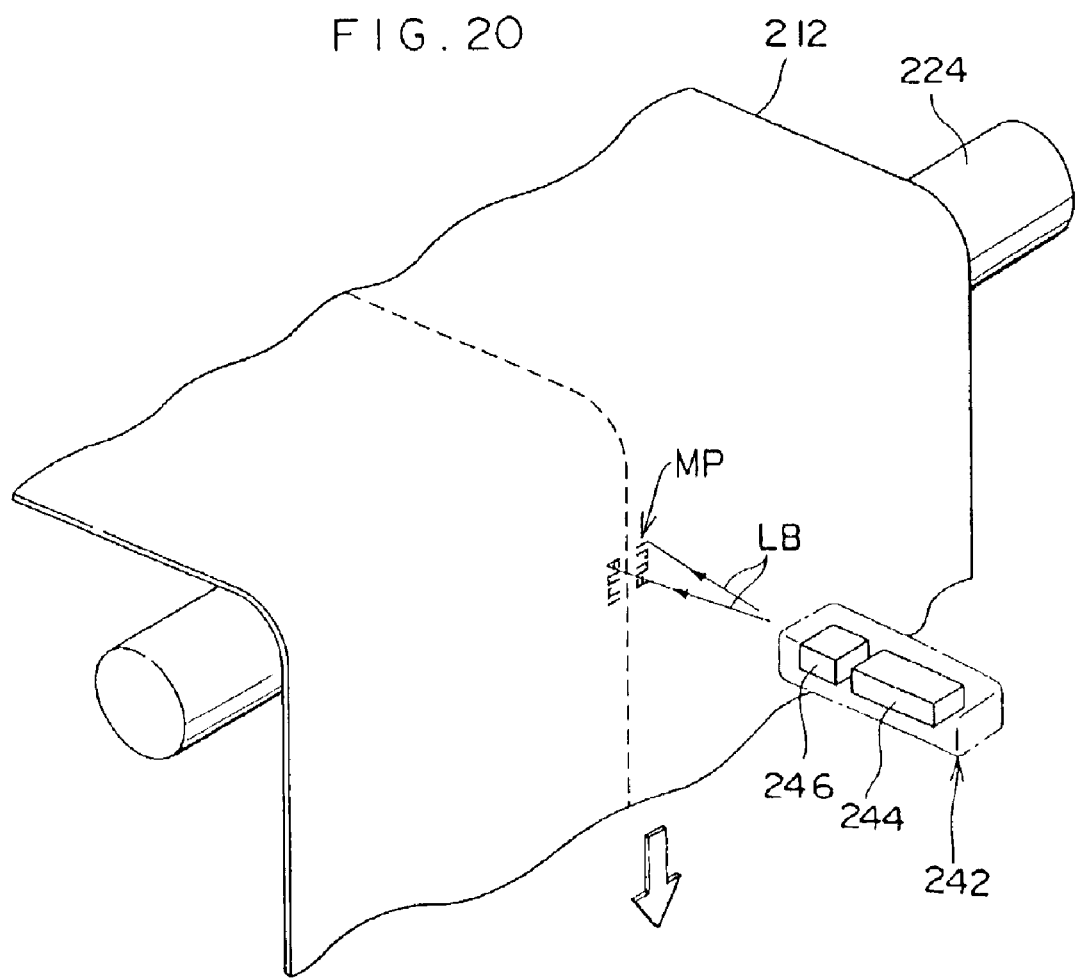
FIG. 20 is an enlarged perspective view near a print roll showing a formed state of a marking pattern by a dot pattern.

As shown in FIG. 19, the x-ray film 212 includes a PET (polyethylene terephthalate) layer 214 as a supporting body and an emulsion layer 216 coated on one of surfaces of the PET layer 214.

As shown in FIG. 18, in a winding roll 218, the x-ray film 212 whose emulsion layer 216 is directed outwardly is wound in a shape of a roll, the x-ray film 212 pulled out an outermost layer of the winding roll 218 is angled by a first pass roll 220, turned to a left perpendicular direction to a proceeding direction, angled again by a second pass roll 222, turned to a right perpendicular direction to the proceeding direction, and reached to a print roll 224.

A part of the x-ray film 212 angled by the print roll 224 is set as a irradiation position of a laser beam LB, the x-ray film 212 is turned to the right perpendicular direction to the proceeding direction by the print roll 224, held by a pair of rollers 226, and turned to the left perpendicular direction to the proceeding direction.

The x-ray film 212 wound out from the pair of rollers 226 forms a conveying path having an approximate U character shape by a pair of small roller 228 and 230. A suction drum 232 is provided in the conveying path having the approximate U character shape. That is to say, the x-ray film 212 is angled by the suction drum 232, so that the conveying path having the approximate U character shape is held.

In the suction drum 232, a plurality of small openings (not shown) are provided in an outer periphery, the wound x-ray film 212 is absorbed and held by air absorption of the suction drum 232, and the suction drum 232 moves downward by self weight or energizing power of energizing means. According to the movement of the suction drum 232, since back tension is given to the x-ray film 212, a state which the x-ray film 212 is close together to the print roll 224 is maintained in the x-ray film 212 passing the print roll 224.

The x-ray film 212 passing through the small roller 228 of a downstream side is wound by the winding roll 234 to be stored.

In the winding rolls 218 and 234 and the suction drum 232, driving means (not shown) such as a motor rotated at a certain revolving speed by a driving signal from a winding control device 236 is provided, basically since at the same linear velocity the winding roll 218 delivers the x-ray film 212 and the winding roll 234 winds the x-ray film 212 while the suction drum 232 rotates with the x-ray film 212 absorbed and held, the per dot pattern is in a range of no lower than 6 μsec to no more than 70 μsec, and fluence per dot pattern can be used in a range of no lower than 0.9 J/cm$_2$ to no more than 10.5 J/cm$_2$.

A rotary encoder 238 is provided in the suction drum 232, so that a rotating state of the suction drum 232 can be detected by pulse oscillation.

A terminal of an output signal of the rotary encoder 238 is connected to a laser control device 240.

The laser control device 40 controls a marking head 242 which the laser beam LB is radiated on the print roll 224.

In the marking head 242, an outgoing exit of the laser beam LB as an end portion of the marking head 242 is provided opposite to the print roll 224.

The marking head 242 includes a laser oscillator 244 and a beam deflector 246 including a condensing lens (not shown).

The laser oscillator 244 applied to the embodiment is a CO$_2$ laser, the laser oscillator 244 radiates the laser beam LB having a constant oscillation wavelength of a certain timing at a constant time width (pulse width) on a basis of a driving signal from the laser control device 40.

The beam deflector 246 includes, for example, AOD (acousto-optic device), and has a function, which scans the laser beam LB by a deflection signal from the laser control device 40 in a perpendicular direction to the conveying direction of the x-ray film 212. Scanned each laser beam LB is focused on the x-ray film 212 by the condensing lens to form a certain spot diameter.

A pattern signal corresponding to the marking pattern (character or mark) to be recorded on the x-ray film 212 is inputted from the winding control device 236 to the laser control device 40. Consequently, the laser control device 40 sends the driving signal to the laser oscillator (CO$_2$ laser) 244 on a basis of a pattern signal to irradiate the laser beam LB, and sends the deflection signal to the beam deflector 246 to scan the laser beam LB, while monitors a conveying length of the x-ray film 212 on a basis of a conveying pulse from the rotary encoder 238.

As shown in FIG. 29, A main-scanning direction should be a scanning direction of the laser beam LB by the beam deflector 246, a sub-scanning direction should be the conveying direction of the x-ray film 212, the marking pattern (alphabet in this case) MP is marked by 5×5 dots.

Figure 21:
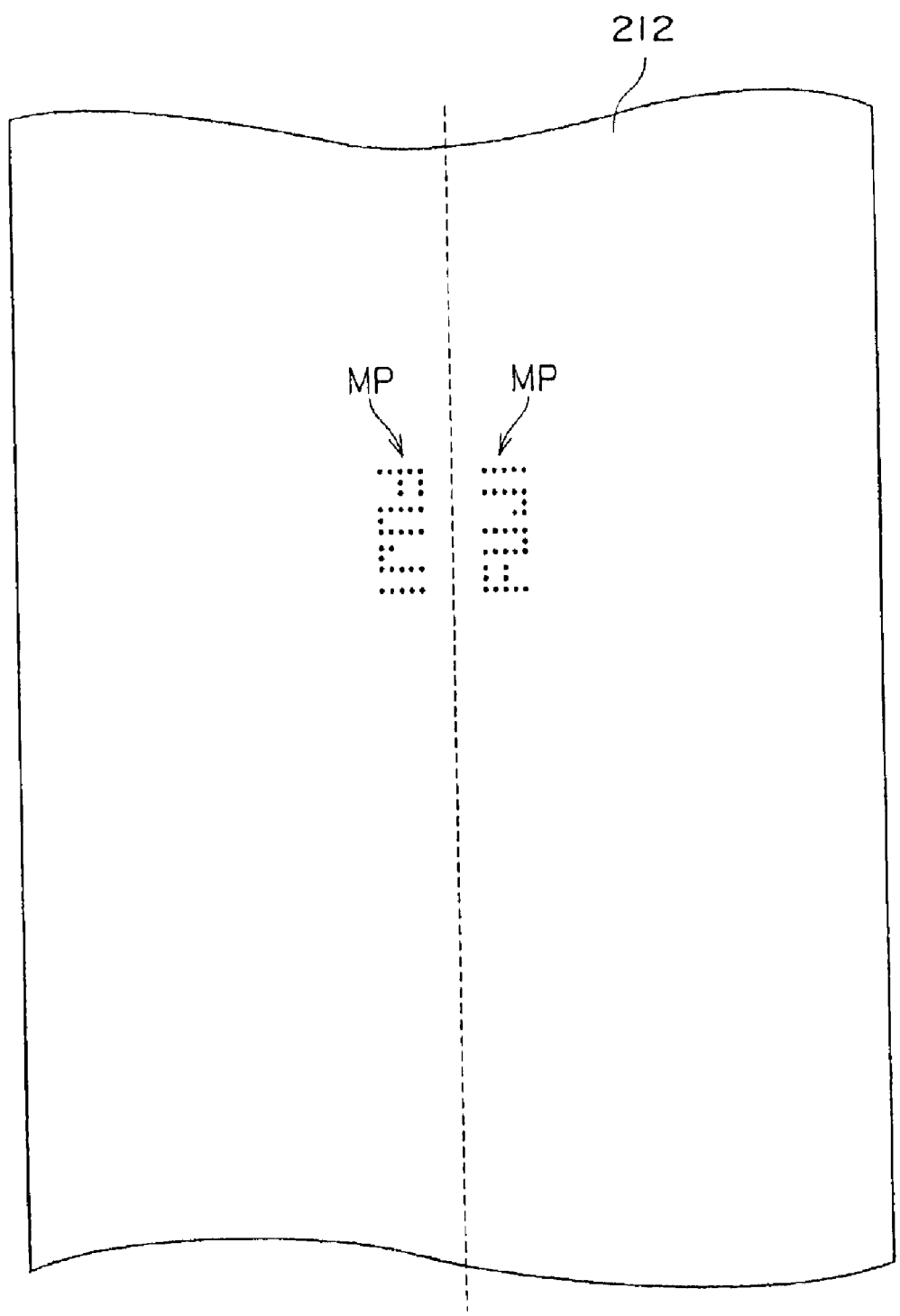
FIG. 21 is a plan view of an X-ray film having a cutting line in a conveying direction.

As shown in FIG. 21, when the x-ray film 212 is cut in a longitudinal direction (cutting line is represented by dotted line) to form the x-ray film 212 in a shape of a sheet, it is possible that facing each other between the cutting line the marking patterns MP are reversely on the both sides.

In order to form the high quality marking pattern MP represented by an array of the dot patterns, it is necessary that each diameter of the dot patterns are arranged at a almost constant diameter and the laser beam LB is irradiated at a position where the conveying speed on the x-ray film 212 is maintained at a constant speed.

A distance between the marking head 242 and the x-ray film 212 is kept constant in a manner that the x-ray film 212 is angled by the print roll 224. Furthermore, the x-ray film 212 is absorbed and held by the suction drum 232, and the laser beam LB is irradiated at a position of the print roll 224 where the conveying speed of the x-ray film 212 corresponds to the linear velocity of the suction drum 232.

In the embodiment, a laser having a wavelength of a 9 μm band (practical range is from 9.2 μm to 9.8 μm) is applied as the oscillation wavelength of the CO$_2$ laser.

The selection is determined by results, which the visibility is tested in the wavelength of the range of the 9 μm band to a 10 μm band used generally at a constant irradiation time. The results are shown in Table 10. An experimental apparatus for testing the oscillation versus visibility will be described later in detailed, and only results will be shown here.

TABLE 10

| Oscillation wavelength (μm) | Visibility | Oscillation wavelength (μm) | Visibility |
|---|---|---|---|
| 9.2 | ○ | 10.2 | Δ |
| 9.3 | ○ | 10.3 | Δ |
| 9.4 | ○ | 10.4 | Δ |
| 9.5 | ○ | 10.5 | Δ |
| 9.6 | ○ | 10.6 | Δ |
| 9.7 | ○ | 10.7 | X |
| 9.8 | ○ | 10.8 | X |

○: The dot pattern can be identified without regard to a direction of line of sight.
Δ: It is difficult to identify the dot pattern dependent on the direction of the line of sight though existence of the dot pattern can be identified.
X: The dot pattern can not be identified at a glance.

Assignment of the range of the oscillation wavelength is fixed by limitation of the necessary irradiation time for one dot which is obtained from the conveying speed (linear velocity) of the x-ray film 212, the number of dots (column by row) of a dot matrix constituting one character, and the number of characters arrayed in the main-scanning direction.

Figure 22:
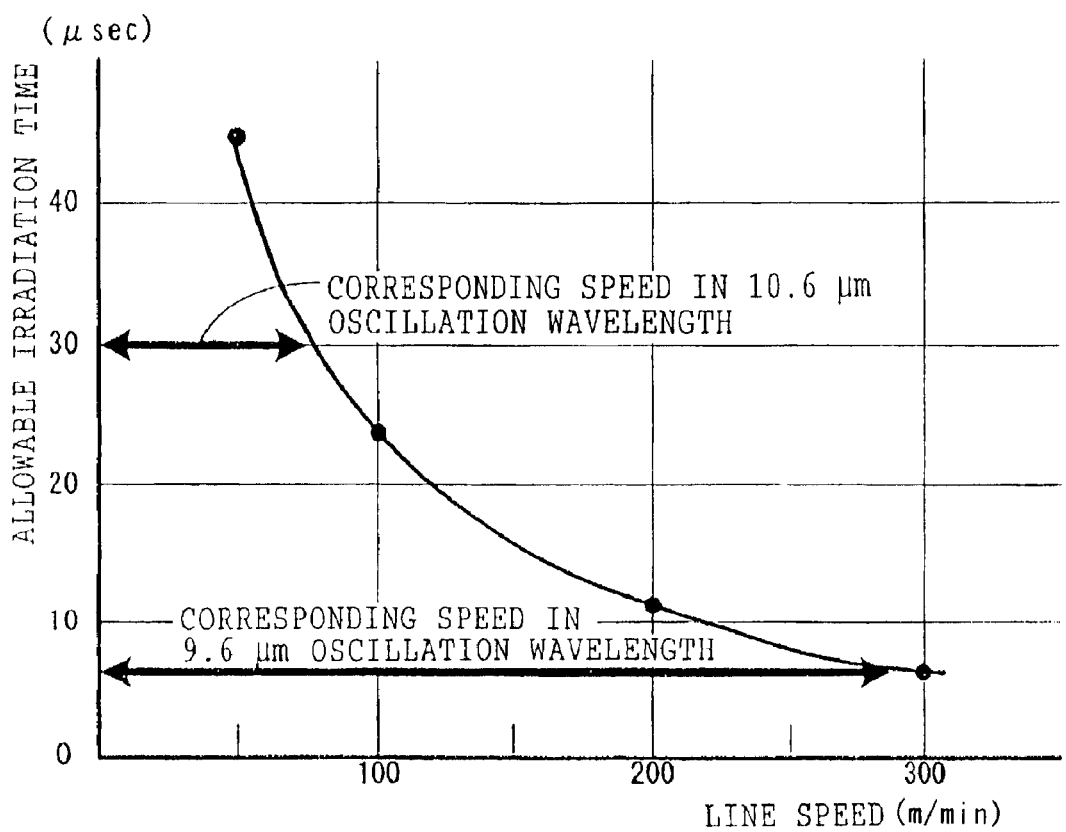
FIG. 22 is a view showing irradiation allowable time versus line speed characteristics.

That is to say, there is a certain relation between the linear velocity and the irradiation time per dot, the relation is illustrated to obtain a characteristic view shown in FIG. 22. The characteristic view is that two characters of a matrix pattern in which one character is constructed by the 5×5 (=25) dots is arrayed.

In order to confirm that there is a proper area of the irradiation time depending on the difference of the oscillation wavelength, the 9 μm band (9.2 μm, 9.3 μm, 9.6 μm, and 9.8 μm as typical examples) and the 10 μm band (10.6 μm as typical example) are applied, the irradiation test was done with the irradiation time varied. The results are shown in Table 11. An experimental apparatus for the irradiation test will be described later in detailed, and only results will be shown here.

TABLE 11

| Irradiation fluence (J/cm$^2$) | Irradiation time (μsec) | Oscillation wavelength | | | | |
|---|---|---|---|---|---|---|
| | | 9.2 μm | 9.3 μm | 9.6 μm | 9.8 μm | 10.6 μm |
| 0.3 | 2 | X | X | X | X | X |
| 0.6 | 4 | Δ(Thin) | Δ(Thin) | Δ(Thin) | Δ(Thin) | X |
| 0.9 | 6 | ○ | ○ | ○ | ○ | X |
| 1.2 | 8 | ○ | ○ | ○ | ○ | X |
| 1.5 | 10 | ○ | ○ | ○ | ○ | X |
| 2.5 | 15 | ○ | ○ | ○ | ○ | X |
| 3.0 | 20 | ○ | ○ | ○ | ○ | Δ(Thin) |
| 4.0 | 25 | ○ | ○ | ○ | ○ | Δ(Thin) |
| 5.0 | 30 | ○ | ○ | ○ | ○ | ○ |
| 5.5 | 40 | ○ | ○ | ○ | ○ | ○ |
| 8.0 | 50 | ○ | ○ | ○ | ○ | ○ |
| 10.0 | 60 | ○ | ○ | ○ | ○ | ○ |
| 10.5 | 70 | ○ | ○ | ○ | ○ | ○ |
| 11.0 | 80 | ○(Fog) | ○(Fog) | ○(Fog) | ○(Fog) | ○(Fog) |

X: Bad visibility
Δ: Thin
○: Good visibility

As can be seen from Table 11, in the oscillation wavelength of 10.6 µm, the 30 seconds irradiation time is required to secure the visibility, so that the line speed of only 70 m/min can be expected from the characteristic view of FIG. 22.

On the other hand, in the oscillation wavelength of 9.2 µm, 9.3 µm, 9.6 µm, and 9.8 µm, the visibility can be maintained even though the irradiation time is 6 µsec. That is to say, from the characteristic view of FIG. 22, it is found that the printing processing can be done at the line speed over 300 m/min.

Operation of the embodiment will be described below,

When the driving signal is outputted from the winding control device 236, the winding roll 218 starts to deliver the x-ray film 212, and the winding roll 234 starts to wind the x-ray film 212.

In the suction drum 232, the angled x-ray film 212 is absorbed and held by starting the air absorption, the suction drum 232 rotates at almost the same linear velocity as that of the winding rolls 218 and 234.

In the winding rolls 218 and 234, because a diameter of the winding roll is varied continuously, it is difficult to maintain the linear velocity at a constant speed, as a result, tension and looseness might be generated in conveying the x-ray film 212. However, because the suction drum 232 securely holds the x-ray film 212 by air absorption, there is no slip in the suction drum 232. And the suction drum 232 gives tension to the x-ray film 212 by the self weight or the energizing power of the energizing means.

The linear velocity of the suction drum 232 becomes a standard linear velocity in a conveying system of the x-ray film 212, the conveying linear velocity of the x-ray film 212 on the print roll 224 corresponds to the linear velocity of the suction drum 232.

A rotating state of the suction drum 232 is detected by the rotary encoder 238, the detected result (conveying pulse) is sent to the laser control device 40.

When the pattern signal corresponding to the marking pattern (character or mark) to be recorded in the x-ray film 212 is inputted from the winding control device 236 to the laser control device 40, the laser control device 40 sends the driving signal to the laser oscillator ($CO_2$ laser) 244 on a basis of a pattern signal to irradiate the laser beam LB, and sends the deflection signal to the beam deflector 246 to scan the laser beam LB, while monitors a conveying length of the x-ray film 212 on a basis of a conveying pulse from the rotary encoder 238.

In the scan, the main-scanning direction should be the scanning direction of the laser beam LB by the beam deflector 246, the sub-scanning direction should be the conveying direction of the x-ray film 212, the marking pattern is marked by 5×5 dots.

In the embodiment, the laser having a wavelength of the 9 µm band (practical range is from 9.2 µm to 9.8 µm) is applied as the oscillation wavelength of the $CO_2$ laser. By using the oscillation wavelength band, compared with the oscillation wavelength of 10.6 µm which is generally used in the $CO_2$ laser, the same visibility can be obtained by shorter irradiation time (refer to Table 10). The reduction of the irradiation time contributes to the conveying speed of the x-ray film 212, namely the line speed, so that production efficiency can be increased.

Figure 24A:
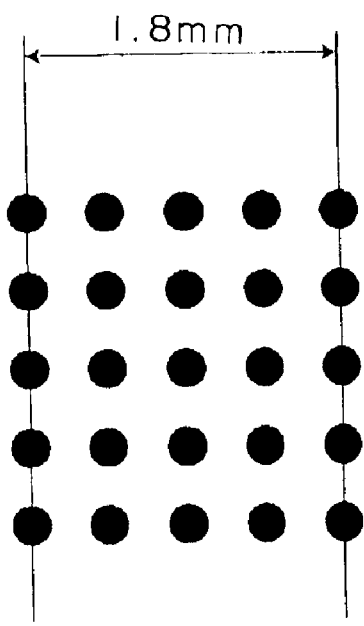
FIG. 24A is a plan view of a photosensitive material showing a forming state when a character of a dot matrix of 5×5 is formed on a photosensitive material and shows a static state of the photosensitive material.
Figure 24B:
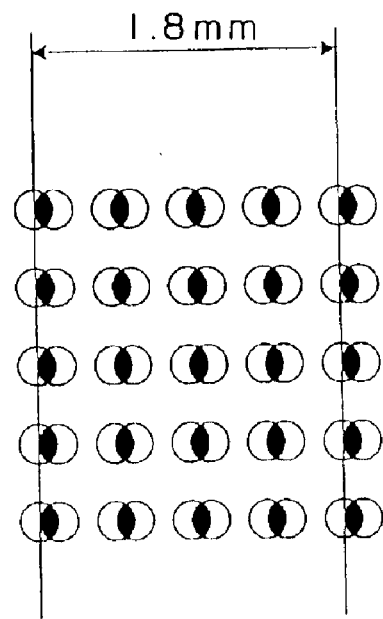
FIG. 24B is a plan view of a photosensitive material showing a forming state when a character of a dot matrix of 5×5 is formed on a photosensitive material and shows a moving state of the photosensitive material.

In case that the dot patterns of two characters in the main-scanning direction is formed on the x-ray film 212 while the x-ray film 212 is conveyed at a line speed of 200 m/min, five lines (sub-scanning line) of the main-scanning line having ten dots per line are required, in all fifty dots are required to form the two characters (refer to FIG. 24A and FIG. 24B).

Applying this to an equation (scanning width per character/(line speed×the number of dots per character)) for obtaining the irradiation time per dot, $t=(1.8 \text{ mm})/\{(200 \text{ m/min})\times 50\}$ $t=(1.8\times 1000\times 60000)/(200\times 1000\times 50)=108000000/10000000=10.8$ µsec According to the calculated irradiation time, the line speed of 200 m/min can not be physically realized by the conventional oscillation wavelength of 10.6 µm.

However, the 9 µm band applied to the embodiment can correspond to the line speed of 200 m/min while the visibility is maintained well.

As described above, in the embodiment, when the dots are formed on the x-ray film 212 by scanning the laser beam, the marking pattern, which is constituted by a matrix array of the 5×5 dots, is obtained, the $CO_2$ laser having the oscillation wavelength of the 9 µm band is applied as the laser oscillator. This permits the visibility to be secured sufficiently in forming the matrix pattern of two characters in the main-scanning direction, while the x-ray film 212 is conveyed at the line speed of 200 m/min.

Though, in the embodiment, the marking pattern is deformed by heat-melting or evaporating forming, in addition to the deformations, an area of a deformed portion and/or a periphery of the deformed portion may be stained or colored. That is to say, by addition of identification from difference in color between the surroundings, the visibility can be further increased in case of a coloring state of the emulsion layer 216 by development, compared with the visibility from difference in reflectivity by deformation.

Though, in the embodiment, the system that the x-ray film 212 is sub-scanned while the laser oscillator ($CO_2$ laser) 244 is scanned mainly is described as the embodiment, the invention is applicable to a system that a plurality of laser oscillators ($CO_2$ laser) 244 are arranged, the x-ray film 212 is conveyed with the plurality of laser oscillators irradiated. In this case, though the dots are flown by the conveyance of the x-ray film 212, tolerance of the pattern formed by an overlapped area may be fixed on a basis of the dot diameter and the visibility even the dot is flown.

EXAMPLES

FIG. 23 is an experimental apparatus 250 for obtaining the visibility of the marking in case that the $CO_2$ laser is applied as the laser oscillator 244.

In the experimental apparatus 250, because the scan of the laser beam LB is not required, the condensing lens 254 is provided in the outgoing exit of the laser oscillator ($CO_2$ laser) 244 which is driven and controlled by the laser control device 40, an evaluation sample 256 is placed instead of the x-ray film 212, the evaluation sample 256 is moved in parallel, and the shape of the marking formed in the evaluation sample 256 is observed.

First Example

A first example is to observe the visibility when the oscillation wavelength of the $CO_2$ laser is varied, the conditions are as follows:

Nd: $CO_2$ laser
Irradiation time: 10 µsec
Spot diameter: 0.2 mm
Oscillation wavelength of experiment: from 9.2 µm to 10.8 µm
Evaluation sample: emulsion layer having thicknesses range of 2 µm to 5 µm is provided on a PET layer having a thickness of 175 µm As shown in Table 10, it is obtained that the visibility is good in the oscillation wavelength in the range of 9.2 $\mu$m to 9.8 $\mu$m, the visibility is somewhat light in the oscillation wavelength in the range of 10.2 $\mu$m to 10.6 $\mu$m, and the visibility is bad in the oscillation wavelength in the range of 10.7 $\mu$m to 10.8 $\mu$m.

Second Example

A second example is to observe difference in visibility between the oscillation wavelength of the 9 $\mu$m band and the 10 $\mu$m band when the irradiation time of the $CO_2$ laser is varied, the conditions are as follows:

Nd: $CO_2$ laser
Irradiation time: from 2 $\mu$sec to 80 $\mu$sec
Spot diameter: 0.2 mm
Oscillation wavelength of experiment: 9.2 $\mu$m, 9.3 $\mu$m, 9.6 $\mu$m, and 9.8 $\mu$m as the typical examples of the 9 $\mu$m band and 10.6 $\mu$m as the typical example as the 10 $\mu$m band As shown in Table 11, it is found that the high visibility is obtained up to 6 $\mu$sec in the oscillation wavelengths of the 9.2 $\mu$m, 9.3 $\mu$m, 9.6 $\mu$m, and 9.8 $\mu$m, however the high visibility is obtained only up to 30 $\mu$sec in the oscillation wavelength of 10.6 $\mu$m.

Because the visibility can be maintained in the shorter irradiation time, the conveying speed of the x-ray film 212 can be increased by the shorter irradiation time, and a secondary defect such as the fog is also hardly generated.

Figure 25:
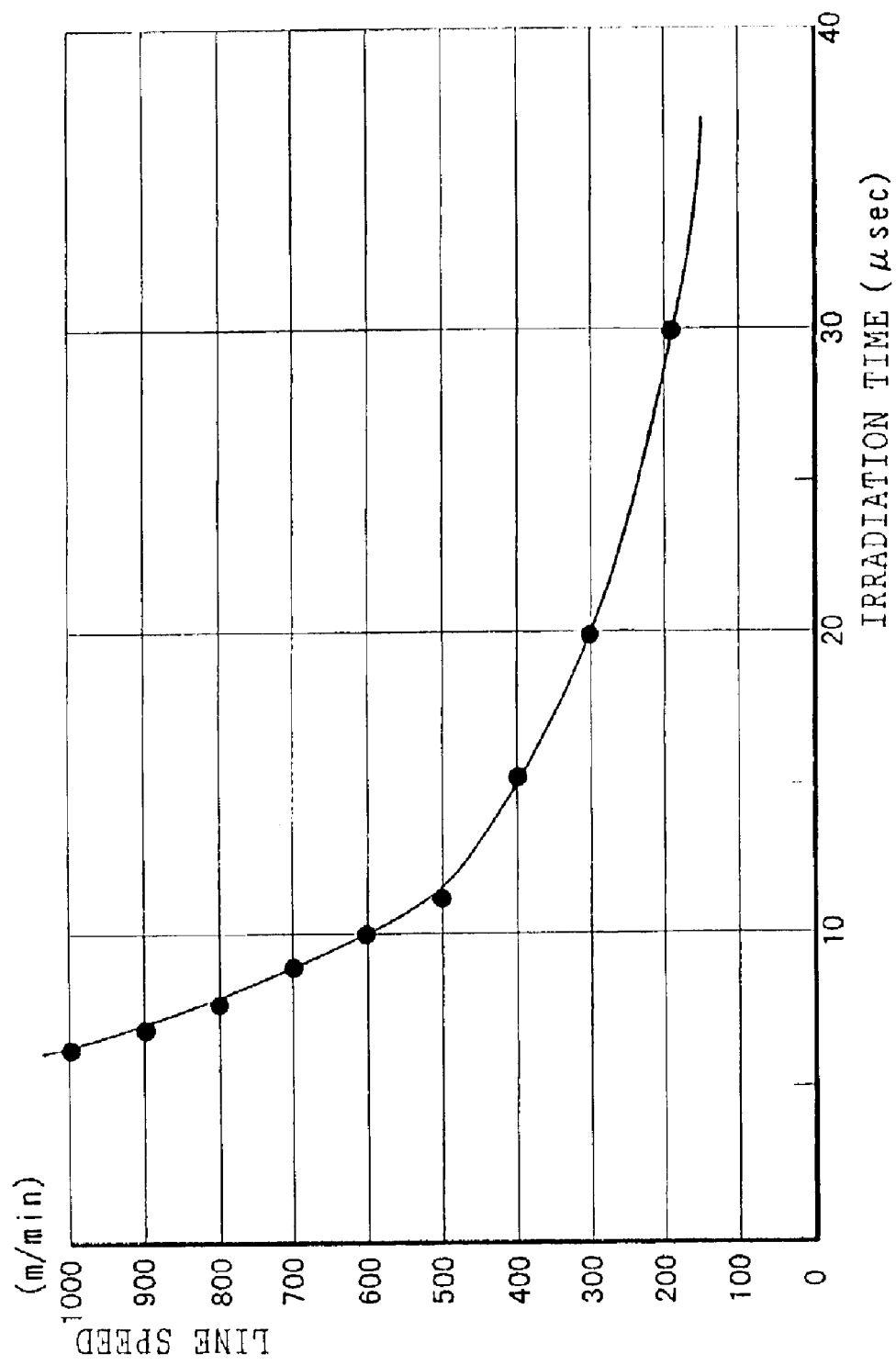
FIG. 25 is a view showing line speed versus irradiation time characteristics when a dot flow is 100 μm.

When the result of the second example is applied to an irradiation versus line speed characteristics, which has a tolerance of 100 $\mu$m of the dot in FIG. 25, the line speed can be remarkably increased in the laser oscillator ($CO_2$ laser) 244 having the oscillation wavelength of the 9 $\mu$m band.

Though the first to third embodiments are described above, the invention is not limited to the embodiments, and the first embodiment to third embodiment may be combined optionally.

What is claimed is:

1. A photosensitive material including a base layer and an emulsion layer with a thickness S, which is formed on a surface of the base layer, and the emulsion layer is irradiated by a laser beam having an almost circular beam spot shape to form a dot pattern, and a character or a mark is printed by an array of the dot patterns, wherein the dot pattern has an irregularity of no more than S+10 $\mu$m in a thickness direction of the photosensitive material, and surface roughness is in a range of 0.2 $\mu$m to 1.0 $\mu$m.

2. The photosensitive material according to claim 1, wherein a depth of a concave portion formed in the base layer directly beneath at least 80% of the dot patterns is in a range of 3 $\mu$m to 10 $\mu$m.

3. A photosensitive material comprising a base layer and an emulsion layer having a thickness S formed on a surface of the base layer, wherein a laser beam having an almost circular beam spot shape is irradiated onto the emulsion layer to form a dot pattern, and the dot pattern is arrayed by M number in a column and N number in a row and a character or a mark whose size of the column by the row is A×B is printed on the photosensitive material, wherein the dot pattern has an irregularity of no more than S+10 $\mu$m in a thickness direction of the photosensitive material, and an almost circular shape not lower than 100 $\mu$m and not more than the smaller diameter either A/M or B/N when viewed from the emulsion layer side.

4. The photosensitive material according to claim 3, wherein a surface roughness of the dot pattern is in a range of 0.2 $\mu$m to 1.0 $\mu$m.

5. A method for marking a photosensitive material comprising a base layer and an emulsion layer having a thickness S formed on a surface of the base layer, wherein the method comprises irradiating a laser beam onto the emulsion layer to form dot patterns in which at least the emulsion layer is melted in an almost circular shape, the dot patterns being arrayed in columns and rows to print a character or a mark, wherein a predetermined irradiation condition forms the dot pattern to have an irregularity of no more than S+10 $\mu$m in a thickness direction of the photosensitive material, and a surface roughness in a range of 0.2 $\mu$m to 1.0 $\mu$m.

6. The marking method according to claim 5, wherein an oscillation wavelength of the laser beam is in a range of 9 $\mu$m to 10 $\mu$m, and the irradiation time per dot pattern is in a range of 3 $\mu$sec to 20 $\mu$sec, when a photosensitive material is an x-ray film using PET as the base layer.

7. The marking method according to claim 5, wherein the irradiation condition of the laser beam is determined such that a depth of a concave portion formed in the base layer directly beneath at least 80% of an amount of the dot patterns is in a range of 3 $\mu$m to 10 $\mu$m, and is irradiated.

8. The marking method according to claim 5, wherein an oscillation wavelength of the laser is selected based on possible irradiation time of the laser beam to each dot pattern for forming a visible dot pattern.

9. A method for marking a photosensitive material comprising a base layer and an emulsion layer having a thickness S formed on a surface of the base layer, wherein the method comprises irradiating a laser beam onto the emulsion layer to form dot patterns in which at least the emulsion layer is melted in an almost circular shape that is arrayed by M number in a column and N number in a row and a character or a mark where the column by the row is A×B is printed, wherein a predetermined irradiation condition of the laser beam forms the dot pattern to have an irregularity of no more than S+10 $\mu$m in a thickness direction of the photosensitive material, and an almost circular shape of no lower than 100 $\mu$m and no more than the smaller diameter either A/M or B/N when viewed from the emulsion layer side.

10. The marking method according to claim 9, wherein a surface roughness of the dot pattern is in a range of 0.2 $\mu$m to 1.0 $\mu$m.

11. The marking method according to claim 9, wherein an oscillation wavelength of the laser beam is in a range of 9 $\mu$m to 10 $\mu$m, and an irradiation time per dot pattern is in a range of 3 $\mu$m to 20 $\mu$sec, when a photosensitive material is an x-ray film using PET as the base layer.

12. A photosensitive material comprising a film base coated with a photosensitive layer on at least one side of the film base, wherein the photosensitive material is irradiated by a laser beam to form a plurality of dot patterns including concave and convex portions, where a character or a mark is printed by an array of the dot patterns, wherein a depth of the concave portions formed in the film base directly beneath at least 80% of an amount of the dot patterns is in a range of 3 $\mu$m to 10 $\mu$m.

13. The photosensitive material according to claim 12, wherein when a printing pattern of one unit including an array of the character or the mark is marked at a constant printing pitch, a character length of the printing pattern of one unit is set at not more than 70% of the printing pitch in a manner that the laser beam is scanned by an acousto-optic device while the photosensitive material is conveyed at a constant speed.

14. A method for marking a film base coated with a photosensitive layer on at least one side of the film base, wherein the method comprises irradiating a photosensitive layer with a laser beam to form a plurality of dot patterns including concave and convex portions, and where a char acter or a mark is printed by an array of the dot patterns, and wherein a predetermined irradiation condition of the laser beam forms the dot patterns such that a depth of a concave portion formed in the film base right beneath at least 80% of an amount of the dot patterns is in a range of 3 µm to 10 µm.

15. The marking method according to claim 14, wherein an oscillation wavelength of the laser is selected on a basis of possible irradiation time of the laser beam to each dot pattern for forming a visible dot pattern.

16. The marking method according to claim 14, wherein when a printing pattern of one unit including an array of the character or the mark is marked at a constant repeated period, and an irradiation time of the laser beam with respect to the constant repeated period is set at not more than 70% in a manner that the laser beam is scanned by an acousto-optic device synchronized to the conveyance of the photosensitive material.

17. The marking method according to claim 14, wherein a photosensitive material is suspended in the air in an area scanned with the laser beam, and any solid body is prevented from existing in an extended optical axis of the laser beam of a non-printing surface side within at least the same length of a focal distance of a condensing lens, which focuses the laser beam on the photosensitive material.

18. The marking method according to claim 14, wherein with respect to a conveying direction of a photosensitive material, conveying rollers are provided in an upstream side and a downstream side of an area scanned with the laser beam, and while a tension of not lower than 0.1 kg/cm is applied to the photosensitive material between the conveying rollers per unit width, and printing is carried out in the photosensitive material suspended in the air by the conveying rollers.

19. A method for marking a photosensitive material comprising an emulsion layer having a thickness S that is disposed on a surface of a PET layer acting as a supporting body, wherein the method comprises irradiating the photosensitive material with a laser beam from a $CO_2$ laser to form a marking pattern comprising a combination of dot patterns formed in a predetermined area, and wherein an oscillation wavelength of the $CO_2$ laser is in a range of 9.2 µm to 9.8 µm, and an irradiation time per dot pattern is in a range of no lower than 6 µsec to no more than 70 µsec, and fluence per dot pattern can be used in a range of no lower than 0.9 $J/cm_2$ to no more than 10.5 $J/cm_2$.

20. The laser marking method according to claim 19, wherein the dot pattern is formed in a certain area by main-scanning and sub-scanning the photosensitive material, where the laser beam and the photosensitive material move in relation to each other.

21. A photosensitive material comprising a base layer and an emulsion layer with a thickness S formed on a surface of the base layer, wherein the emulsion layer is irradiated by a laser beam to form a dot pattern, and the dot pattern has an irregularity of no more than S+10 µm in a thickness direction of the photosensitive material, and a surface roughness in a range of 0.2 µm to 1.0 µm.

22. The photosensitive material according to claim 21, wherein a character or a mark is printed by an array of the dot patterns.

23. The photosensitive material according to claim 22, wherein a depth of a concave portion formed in the base layer directly beneath at least 80% of the dot patterns is in a range of 3 µm to 10 µm.

* * * * *